United States Patent
Bang et al.

(10) Patent No.: US 11,310,779 B2
(45) Date of Patent: Apr. 19, 2022

(54) METHOD AND APPARATUS FOR TRANSMITTING/RECEIVING CONTROL INFORMATION IN WIRELESS COMMUNICATION SYSTEM

(71) Applicant: Samsung Electronics Co., Ltd., Suwon-si (KR)

(72) Inventors: Jonghyun Bang, Suwon-si (KR);
Jinyoung Oh, Suwon-si (KR);
Taehyoung Kim, Suwon-si (KR);
Hyunseok Ryu, Suwon-si (KR);
Sungjin Park, Suwon-si (KR);
Cheolkyu Shin, Suwon-si (KR);
Jeongho Yeo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 113 days.

(21) Appl. No.: 16/736,024

(22) Filed: Jan. 7, 2020

(65) Prior Publication Data
US 2020/0221449 A1    Jul. 9, 2020

(30) Foreign Application Priority Data

Jan. 7, 2019  (KR) .................. 10-2019-0001622

(51) Int. Cl.
*H04L 12/28*      (2006.01)
*H04W 72/04*    (2009.01)

(52) U.S. Cl.
CPC ..... *H04W 72/0413* (2013.01); *H04W 72/042* (2013.01)

(58) Field of Classification Search
CPC ............................ H04W 72/0413; H04L 27/18
See application file for complete search history.

(56) References Cited

U.S. PATENT DOCUMENTS

2018/0324768 A1  11/2018  Shaheen et al.
2019/0037540 A1   1/2019  Seo et al.
(Continued)

FOREIGN PATENT DOCUMENTS

| WO | 2017/160100 A2 | 9/2017 |
| WO | 2018/174639 A1 | 9/2018 |
| WO | 2018/204333 A1 | 11/2018 |

OTHER PUBLICATIONS

Huawei et al., "DL channels and signals in NR unlicensed band", R1-1812192, 3GPP TSG RAN WG1 Meeting #95, Spokane, USA, Nov. 3, 2018, sections 3, 4.2.
(Continued)

*Primary Examiner* — Bo Hui A Zhu
(74) *Attorney, Agent, or Firm* — Jefferson IP Law, LLP

(57) ABSTRACT

A communication method and a system for converging a 5th-Generation (5G) communication system for supporting higher data rates beyond a 4th-Generation (4G) system with a technology for Internet of Things (IoT) are provided. The disclosure may be applied to intelligent services based on the 5G communication technology and the IoT-related technology, such as smart home, smart building, smart city, smart car, connected car, health care, digital education, smart retail, security and safety services. The disclosure relates to a method and an apparatus for transmitting/receiving a control channel in a wireless communication system. More specifically, a method for determining a downlink control channel transmission configuration of a base station by providing control channel area configuration information together, which is used when sharing a downlink resource with the base station within a maximum channel occupancy interval acquired by a User Equipment (UE) is provided.

16 Claims, 13 Drawing Sheets

(56) References Cited

U.S. PATENT DOCUMENTS

2019/0261454 A1* 8/2019 Xiong ................ H04L 25/0328
2019/0349904 A1* 11/2019 Kwak ................ H04W 72/042
2020/0389847 A1* 12/2020 Deng ................ H04B 7/0617
2021/0168855 A1* 6/2021 Zhang .............. H04W 72/0446

OTHER PUBLICATIONS

Intel Corporation, "On the NR-unlicensed frame structure", R1-1812479, 3GPP TSG RAN WG1 Meeting #95, Spokane, USA, Nov. 3, 2018, sections 1, 3, 6, 7.2.1.1; and figure 1.
LG Electronics, "Frame structure for NR unlicensed operation", R1-1812557, 3GPP TSG RAN WG1 Meeting #95, Spokane, USA, Nov. 3, 2018, section 3.
Huawei et al., 'NR numerology and frame structure for unlicensed bands', R1-1812191, 3GPP TSG RAN WG1 Meeting #95, Spokane, USA, Nov. 3, 2018, sections 1-4.
International Search Report dated Apr. 22, 2020, issued in International Application No. PCT/KR2020/000243.
"3rd Generation Partnership Project; Technical Specification Group Radio Access Network; NR; Physical layer procedures for control (Release 15)", 3GPP Draft; 38213-F30, 3rd Generation Partnership Project (3GPP), Oct. 1, 2018, XP051477732.
Extended European Search Report dated Jan. 7, 2022, issued in European Patent Application No. 20738648.3.

* cited by examiner

METHOD AND APPARATUS FOR TRANSMITTING/RECEIVING CONTROL INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0001622, filed on Jan. 7, 2019, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for transmitting/receiving control information in a wireless communication system. More particularly, the disclosure relates to a method for monitoring or searching for a downlink control channel in a wireless communication system, particularly, a system that transmits an uplink signal through an unlicensed band and a node, or a system that receives a downlink signal and a node.

2. Description of Related Art

To meet the demand for wireless data traffic having increased since deployment of 4th-Generation (4G) communication systems, efforts have been made to develop an improved 5th-Generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency-Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In the case of the 5G communication system, various technologies have been introduced to provide various services and to support a high data transmission rate, such as a technology for code block group-based retransmission, a technology capable of transmitting an uplink signal without uplink scheduling information, and the like. Therefore, if the 5G communication is to be performed through an unlicensed band, a more efficient channel access procedure is necessary in view of various parameters.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and an apparatus for transmitting/receiving control information in a wireless communication system. An embodiment provides a method for configuring a downlink control channel and monitoring or searching for a control channel in a wireless communication system that transmits/receives a downlink signal through an unlicensed band.

Additional aspects will be set forth in part in the description which follows and, in part, will be apparent from the description, or may be learned by practice of the presented embodiments.

In accordance with an aspect of the disclosure, a method of a User Equipment (UE) in a wireless communication system is provided. The UE includes receiving control channel configuration information from a base station through radio resource control signaling, transmitting, in a case of it being determined to use a partial resource as a downlink within a channel occupancy interval acquired by the UE, uplink control information to the base station, the uplink control information including at least one piece of configuration information among the control channel configuration information, and receiving a control channel signal from the base station based on the configuration information.

In accordance with another aspect of the disclosure, a method of a base station in a wireless communication system is provided. The method includes transmitting control channel configuration information to a UE through radio resource control signaling, receiving, in a case of it being determined to use a partial resource as a downlink within a channel occupancy interval acquired by the UE, uplink control information from the UE, the uplink control information including at least one piece of configuration information among the control channel configuration information, and transmitting a control channel signal to the UE based on the configuration information.

In accordance with another aspect of the disclosure, a UE in a wireless communication system is provided. The UE includes a transceiver and a controller configured to receive control channel configuration information from a base station through radio resource control signaling through the transceiver, to transmit, in a case of it being determined to use a partial resource as a downlink within a channel occupancy interval acquired by the UE, uplink control information to the base station through the transceiver, the uplink control information including at least one piece of configuration information among the control channel configuration information, and to receive a control channel signal from the base station based on the configuration information.

In accordance with another aspect of the disclosure, a base station in a wireless communication system is provided. The base station includes a transceiver and a controller configured to transmit control channel configuration information to a UE through radio resource control signaling through the transceiver, to receive, if it is determined to use a partial resource as a downlink within a channel occupancy interval acquired by the UE, uplink control information from the UE through the transceiver, the uplink control information including at least one piece of configuration information among the control channel configuration information, and to transmit a control channel signal to the UE based on the configuration information.

The disclosure seeks to propose a method for performing physical downlink control channel (PDCCH) or physical downlink shared channel (PDSCH) transmission/reception within a maximum channel occupiable interval acquired by a UE, in connection with a base station and a UE configured to receive or transmit a downlink signal or an uplink signal in an unlicensed band. More specifically, the disclosure proposes a method and an apparatus for instructing (or changing or adjusting) control channel configuration information for PDCCH reception by the UE.

An embodiment proposes a method wherein, in connection with a base station and a UE operating in an unlicensed band, a downlink resource area to be shared by the UE is determined based on control channel information for monitoring or searching for the PDCCH of the UE, configured by the base station for the UE.

An embodiment proposes a method wherein, in connection with a base station and a UE operating in an unlicensed band, the UE requests the base station to provide control channel configuration information for monitoring or searching for a PDCCH.

An embodiment proposes a method wherein, if a UE and a base station share a part of a maximum channel occupancy interval acquired by the UE as a downlink transmission resource, at least one or multiple pieces of separate control channel information are configured for monitoring or searching for the PDCCH of the UE.

An embodiment proposes a method for configuring a control channel when a UE request a PDCCH monitoring or search configuration in a situation in which the number of CORESETs or search spaces is limited.

An embodiment proposes a method wherein, if a UE requests a PDCCH monitoring or search configuration, the UE configures at least one or multiple from among configured CORESET or search space sets for the purpose of PDCCH monitoring or search.

An embodiment proposes a method wherein, in connection with a base station and a UE operating in an unlicensed band, the UE changes a symbol (or slot) configured as an occasion for monitoring or searching for a PDCCH to an uplink transmission resource.

Advantageously, an embodiment proposes a method for configuring downlink control channel information in a wireless communication system, thereby improving the reception efficiency in a downlink control channel and in a data channel area.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
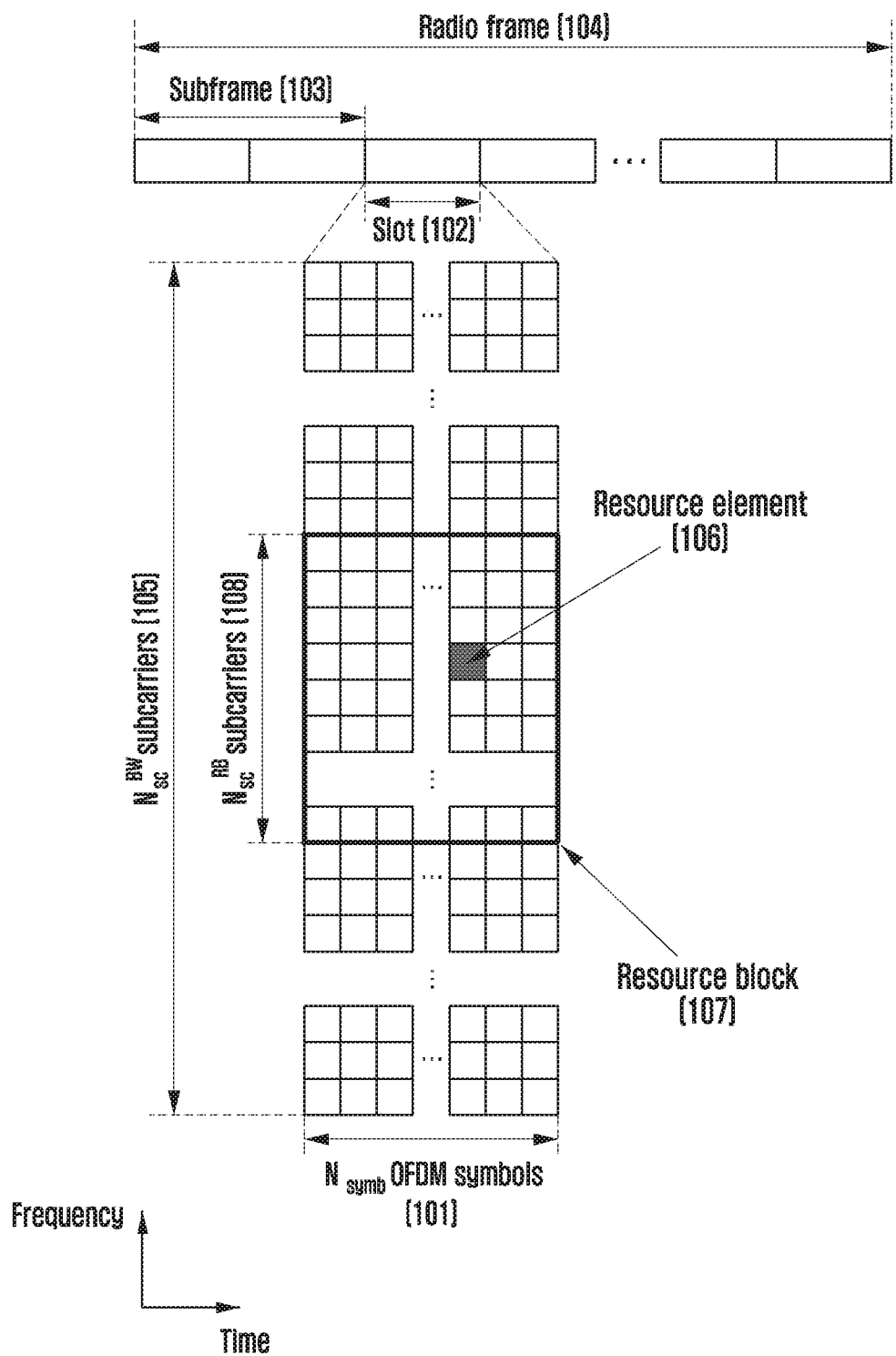
FIG. 1 is a diagram illustrating a time/frequency domain transmission structure of an uplink or a downlink in a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

In describing the embodiments, descriptions of technologies which are already known to those skilled in the art and are not directly related to the disclosure may be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more Central Processing Units (CPUs) within a device or a security multimedia card. Also, in an embodiment, the '~ unit' may include one or more processors.

A wireless communication system has developed to be a broadband wireless communication system that provides a high speed and high quality packet data service, like the communication standards, for example, High Speed Packet Access (HSPA) of 3rd generation partnership project (3GPP), Long Term Evolution (LTE) or evolved universal terrestrial radio access (E-UTRA), LTE-advanced (LTE-A), High Rate Packet Data (HRPD) of 3GPP2, Ultra Mobile Broadband (UMB), and 802.16e of IEEE, or the like, beyond the voice-based service provided at the initial stage. Also, communication standard of 5G or new radio (NR) is being developed as a 5G wireless communication system.

First, the terms used in this specification will be defined.

The specific terms used herein are provided for ease of understanding the disclosure, and such specific terms may be changed into other forms without departing from the spirit and scope of the disclosure. The terms as described below are defined in consideration of the functions in the embodiments, and the meaning of the terms may vary according to the intention of a user or operator, convention, or the like. Therefore, the definitions of the terms should be made based on the contents throughout the specification.

Terms for identifying access nodes, terms denoting network entities, terms denoting messages, terms denoting interfaces between network entities, terms denoting various kinds of identification information, and the like, used in the following description, are examples for facilitating the description. Accordingly, the disclosure is not limited to the terms described below, and different terms may be used to denote entities having the same technical meanings.

Hereinafter, the disclosure will be described, for convenience of description, by using terms and names defined by the standards of Long Term Evolution (LTE)/New Radio (NR) according to the 3rd generation partnership project (hereinafter, referred to as 3GPP). However, the disclosure is not limited to the above terms and names, and is equally applicable to systems following other standards.

As used herein, "base station" refers to a terminal node in a network configured to directly communicate with a UE. A specific operation described herein as being performed by the base station may also be performed by an upper node of the base station in some cases. That is, it is obvious that various operations performed for communication with a UE in a network including various network nodes (including the base station) may be performed either by the base station or other network nodes than the base station.

"Base station" refers to an entity configured to assign resources to a UE, and may also be referred to as a fixed station, a Node B, an evolved Node B (eNode B or eNB), a BS, a base transceiver system (BTS), an access point (AP), a wireless access unit, a base station controller, or a node in a network.

In addition, "UE" may be stationary or mobile, and may also be referred to as a terminal, user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, or the like. In addition, a UE may include a cellular phone, a smartphone, a computer, or a multimedia system capable of performing a communication function.

Hereinafter, a downlink (DL) refers to communication from a base station to a UE, and an uplink (UL) refers to communication from a UE to a base station. In the case of the downlink, the transmitter may be a part of the base station, and the receiver may be a part of the UE. In the case of the uplink, the transmitter may be a part of the UE, and the receiver may be a part of the base station.

Specific terms used in the following description are provided to facilitate understanding of the disclosure, and use of such specific terms may be modified to a different from without deviating from the technical idea of the disclosure.

In addition, although embodiments will be described hereinafter with regard to an LTE or LTE-A system as an example, but the embodiments are applicable to other kinds of communication systems having similar technical backgrounds or channel types. For example, 5th generation mobile communication technologies (5G and New Radio (NR)) developed after LTE-A may be included therein.

In addition, embodiments may be applied to other communication systems through partial modifications without substantially deviating from the scope of the disclosure as deemed by a person skilled in the art.

In 5G systems, support for more diversified services, compared with existing 4G systems, is being considered. For example, the most representative services may include enhanced mobile broadband (eMBB), ultra-reliable and low-latency communication (URLLC), massive machine-type communication (mMTC), evolved multimedia broadcast/multicast service (eMBMS), and the like. In addition, a system that provides the URLLC service may be referred to a URLLC system, and a system that provides the eMBB service may be referred to as an eMBB system. Furthermore, the terms "service" and "system" may be used interchangeably.

Multiple services may be provided to users in a communication system as described above, and there is accordingly a demand for a method capable of providing respective services in the same time interval according to characteristics, in order to provide such multiple services to users, and an apparatus using the same.

Meanwhile, in a wireless communication system such as an LTE or LTE-A system or a 5G New Radio (NR) system, a base station may be configured to transmit downlink control information (DCI) including resource assignment information or the like, which is used to transmit a downlink signal, to a UE through a physical downlink control channel (PDCCH) such that the UE receives at least one downlink signal among the downlink control information (for example, channel state information reference signal (CSI-RS), physical broadcast channel (PBCH), or physical downlink shared channel (PDSCH)). For example, the base station transmits DCI to the UE through the PDCCH in subframe n so as to instruct the UE to receive the PDSCH in subframe n, and the UE, after receiving the DCI, receives the PDSCH in subframe n according to the received DCI.

In addition, in an LTE, LTE-A, or NR system, a base station may be configured to transmit DCI, including uplink resource assignment information, to a UE through a PDCCH such that the UE transmits at least one uplink signal among uplink control information (for example, sounding reference signal (SRS), uplink control information (UCI), physical random access channel (PRACH), or physical uplink shared channel (PUSCH)) to the base station. For example, if the UE receives, in subframe n, uplink transmission configuration information (or DCI or UL grant) transmitted from the base station through the PDCCH, the UE may transmit an uplink signal to the base station through the PUSCH according to a predefined time (for example, subframe n+4), a time configured through an upper-level signal (for example, subframe n+k), or uplink signal transmission time indicator information (for example, subframe n+k) included in the uplink transmission configuration information (hereinafter, referred to as PUSCH transmission). If the configured downlink transmission or the configured uplink transmission is performed through an unlicensed band, the transmitting device (for example, the transmitting device may be the base station in the case of downlink transmission, and may be the UE in the case of uplink transmission) may perform a channel access procedure or listen before talk (LBT) before or immediately before the occasion at which the configured signal transmission starts.

For example, if it is confirmed as a result of performing the channel access procedure that the unlicensed band is idle, the transmitting device (base station or UE) may access the unlicensed band and perform the configured signal transmission. In addition, if it is confirmed as a result of performing the channel access procedure that the unlicensed band is not idle (or is occupied), the transmitting device cannot access the unlicensed band, and thus is unable to perform the configured signal transmission.

In general, during a channel access procedure in an unlicensed band for which the signal transmission is configured, the transmitting device may receive a signal in the unlicensed band for a predetermined time or for a time acquired according to a predefined rule (for example, time calculated at least through one random value selected by the base station or the UE) and may compare the intensity of the received signal with a threshold value defined in advance or acquired by a function including at least one variable from among the channel bandwidth or the signal bandwidth through which a signal to be transmitted is transmitted, the intensity of transmission power, the beam width of a transmission signal, and the like, thereby determining whether or not the unlicensed band is idle. For example, if the intensity of a signal received for 25 us by the transmitting device is lower than a predetermined threshold value of −72 dBm, the transmitting device may determine that the unlicensed band is idle and may perform the configured signal transmission. The maximum possible signal transmission time may be limited according to the maximum channel occupancy time defined for each nation/region in the unlicensed band, or the type of the transmitting device (for example, base station, UE, master device, or slave device). For example, in the case of Japan, a base station or a UE may perform a channel access procedure in a 5 GHz unlicensed band and may then transmit signals while occupying the channel, without performing an additional channel access procedure, for a maximum time of 4 ms. If the intensify of a signal received for 25 us is higher than the predefined threshold value of −72 dBm, the base station determines that the unlicensed band is not idle and transmits no signal.

In the case of the 5G communication system, various technologies have been introduced to provide various services and to support a high data transmission rate, such as a technology for code block group-based retransmission, a technology capable of transmitting an uplink signal without uplink scheduling information, and the like. Therefore, if the 5G communication is to be performed through an unlicensed band, a more efficient channel access procedure is necessary in view of various parameters.

As described above, in a wireless communication system including 5G, a UE may be provided with at least one service from among enhanced mobile broadband (eMBB), massive machine-type communication (mMTC), and ultra-reliable and low-latency communication (URLLC). In addition, these services may be provided to the same UE for the same time interval.

In various embodiments, eMBB may be a service aimed at high-speed transmission of a large amount of data, mMTC may be a service aimed at minimizing power consumed by UEs and accessing multiple UEs, and URLLC may be a service aimed at high reliability and low latency, but the same are not limited thereto. The three services may be major scenarios in an LTE system or post-LTE 5G/NR (New Radio or Next Radio) system.

If the base station has scheduled, for the UE, data corresponding to the eMBB service in a specific transmission time interval (TTI), and if a situation in which URLLC data needs to be transmitted in the TTI occurs, the base station may not transmit a part of the eMBB data in a frequency band in which the eMBB data has already been scheduled and transmitted, and may transmit the generated URLLC data in the frequency band. The UE for which the eMBB is scheduled and the UE for which the URLLC is scheduled may be the same UE or different UEs.

In such a case, a part of the eMBB data that has already been scheduled is not transmitted, thereby increasing the possibility that the eMBB data will be damaged. Therefore, there is a need for a method for processing signals received by the UE for which eMBB is scheduled or by the UE for which URLLC is scheduled, and a method for receiving the signals.

Hereinafter, embodiments will be described in detail with reference to the accompanying drawings. In the following description of the disclosure, detailed descriptions of known functions or configurations will be omitted if the same are deemed to be likely to make the gist of the disclosure unnecessarily unclear. As a representative example of a wideband wireless communication system, the NR system employs an orthogonal frequency division multiplexing (OFDM) scheme in the downlink (DL) and employs both OFDM and single carrier frequency division multiple access (SC-FDMA) schemes in the uplink (UL). For example, SC-FDMA may be used in the same sense as discrete Fourier transform-spread-OFDM (DFT-s-OFDM).

The uplink refers to a wireless link through which a UE or a mobile station (MS) transmits data or a control signal to an eNode B (or base station (BS)), and the downlink refers to a wireless link through which the base station transmits data or a control signal to the UE. The above-mentioned multi-access scheme assigns and operates time-frequency resources, by which data or control information is to be carried and sent with regard to respective users, so as not to overlap each other (that is, orthogonality is established) such that each user's data or control information can be distinguished.

The NR system adopts a hybrid automatic repeat request (HARQ) scheme such that, if decoding fails during the initial transmission, the corresponding data is retransmitted in the physical layer. According to the HARQ scheme, if the receiver fails to accurately decode data, the receiver transmits information indicating the decoding failure (negative acknowledgement (NACK)) to the transmitter such that the transmitter can retransmit the corresponding data in the physical layer. The receiver combines data retransmitted by the transmitter with data, which has previously failed to be decoded, thereby increasing the data receiving performance. In addition, if the receiver accurately decodes data, the receiver transmits information indicating the successful decoding (acknowledgement (ACK)) to the transmitter such that the transmitter can transmit new data.

FIG. 1 is a diagram illustrating a time/frequency domain transmission structure of an uplink or a downlink in an NR system according to an embodiment of the disclosure.

Specifically, FIG. 1 is a diagram illustrating the basic structure of time and frequency domains, which are radio resource areas for transmitting data or a control channel, in an uplink or a downlink of an NR system or a similar system.

Referring to FIG. 1, the horizontal axis denotes the time domain, and the vertical axis denotes the frequency domain. The minimum transmission unit in the time domain is an OFDM or DFT-s-OFDM symbol, and a group of $N_{symb}$ OFDM or DFT-s-OFDM symbols 101 constitutes one slot 102. The OFDM symbols refer to symbols related to a case in which signals are transmitted/received by using the OFDM multiplexing scheme, and the DFT-s-OFDM symbols refer to symbols related to a case in which signals are transmitted/received by using the DFT-s-OFDM or SC-FDMA multiplexing scheme. In the following description of the disclosure, OFDM symbols and DFT-s-OFDM symbols will be interchangeably referred to as OFDM symbols, and signal transmission/reception through the downlink will be assumed, but the same description is applicable to signal transmission/reception through the uplink.

Referring to FIG. 1, a radio frame 104 is a time-area interval including ten subframes, the minimum transmission unit in the frequency domain is a subcarrier, and the entire system transmission bandwidth may include a total of $N_{SC}^{BW}$ subcarriers 105.

The spacing between subcarriers may be diversified in the NR, and the number of slots constituting one subframe may also be diversified.

Referring to FIG. 1, if the spacing between subcarriers is 15 kHz, a group of two slots constitutes one subframe 103, the slot length is 0.5 ms, and the subframe length is 1 ms. The number of slots constituting one subframe 103 and the length of the slots may vary depending on the spacing between subcarriers. For example, if the spacing between subcarriers is 30 kHz, a group of four slots may constitute one subframe 103. In this case, the slot length is 0.25 ms, and the subframe length is 1 ms. However, the above-mentioned specific numerical values may be variably applied. For example, in the case of an LTE system, the spacing between subcarriers is 15 kHz, but a group of two slots constitutes one subframe 103. In this case, the slot length is 0.5 ms, and the subframe length is 1 ms.

The basic unit of resources in the time-frequency domain is a resource element (RE) 106, which may be described in terms of an OFDM symbol index and a subcarrier index. A resource block (RB) 107 or a physical resource block (PRB) 107 may be defined by $N_{sumb}$ consecutive OFDM symbols 101 in the time domain and $N_{SC}^{RB}$ consecutive subcarriers 108 in the frequency domain. Accordingly, one RB 107 in one slot may include $N_{sumb} \times N_{SC}^{RB}$ REs. In general, the minimum assignment unit of data in the frequency domain is the RB 107.

In general, in an NR system, $N_{sumb}=14$, $N_{SC}^{RB}=12$, and the number of RBs (NRB) may vary depending on the bandwidth of the system transmission band. In an LTE system, in general, $N_{sumb}=7$, $N_{SC}^{RB}=12$, and $N_{RB}$ may vary depending on the bandwidth of the system transmission band.

Downlink control information (DCI) may be transmitted within the initial N OFDM symbols inside the subframe. In general, N={1, 2, 3} may be the case, and the UE may receive a configuration of the number of symbols that can be used to transmit the DCI, through an upper-level signal, from the base station. In addition, according to the amount of control information to be transmitted in the current slot, the base station may differently configure the number of symbols that can be used to transmit the DCI with regard to each slot, and may deliver information regarding the number of symbols to the UE through a separate downlink control channel.

Scheduling information regarding downlink data or uplink data in the NR or LTE system may be delivered from the base station to the UE through DCI.

The DCI according to various embodiments is defined according to various formats, and may include, according to each format, information regarding whether the same is scheduling information (UL grant) regarding uplink data or scheduling information (DL grant or DL assignment) regarding downlink data, information regarding whether or not the same is compact DCI having a small control information size, information regarding whether or not the control information is fallback DCI, information regarding whether or not spatial multiplexing is applied by using a multi-antenna, and information regarding whether or not the DCI is for power control.

For example, a DCI format (for example, NR's DCI format 1_0), which is scheduling control information (DL grant) regarding downlink data, may include at least one of the following pieces of control information:

DCI format identifier: an identifier for identifying the format of received DCI.

Frequency domain resource assignment: indicates a RB assigned for data transmission.

Time domain resource assignment: indicates slots and symbols assigned for data transmission.

virtual resource block (VRB)-to-PRB mapping: indicates whether or not a VRB mapping scheme is applied.

Modulation and coding scheme (MCS): indicates a modulation scheme used for data transmission and the size of a transport block (TB), which is data to be transmitted;

New data indicator: indicates HARQ initial transmission or retransmission.

Redundancy version: indicates the redundancy version of the HARQ.

HARQ process number: indicates the process number of the HARQ.

PDSCH assignment index: indicates, to the UE, the number of PDSCH reception results (for example, number of HARQ-ACKs) to be reported to the base station.

Transmit power control (TPC) command for physical uplink control channel (PUCCH): indicates a TPC command regarding the PUCCH.

PUCCH resource indicator: indicates a PUCCH resource used to report a HARQ-ACK including the reception result regarding a PDSCH configured through the corresponding DCI.

PDSCH-to-HARQ feedback timing indicator: indicates information regarding the slot or symbol to transmit the PUCCH for reporting a HARQ-ACK including the reception result regarding a PDSCH configured through the corresponding DCI.

The DCI may undergo channel coding and modulation processes and may be transmitted through a physical downlink control channel (PDCCH) (or control information; hereinafter, to be used interchangeably), an enhanced PDCCH (EPDCCH) (or enhanced control information; hereinafter, to be used interchangeably), or a control resource set (CORESET).

In general, the DCI is scrambled with a specific radio network temporary identifier (RNTI) (or cell-radio network temporary identifier (C-RNTI), which is a UE identifier) independently of each UE, has a cyclic redundancy check (CRC) added thereto, is channel-coded, and is configured as each independent PDCCH, which is then transmitted. In the time domain, the PDCCH is mapped and transmitted for the control channel transport interval. The frequency-area mapping position of the PDCCH is determined by the ID of each UE, and may be transmitted while being spread over the entire system transmission band.

Downlink data may be transmitted through a physical downlink shared channel (PDSCH), which is a physical channel for downlink data transmission. The PDSCH may be transmitted after the control channel transport interval, and scheduling information such as the detailed mapping position in the frequency domain and the modulation scheme is determined based on the DCI transmitted through the PDCCH.

Through the MCS among the control information constituting the DCI, the base station notifies the UE of the modulation scheme applied to the PDSCH to be applied, and the size of data to be transmitted (transport block size (TBS). For example, the MCS may include five bits, more bits, or less bits. The TBS corresponds to a size before channel coding for error correction is applied to data (transport block (TB)) to be transmitted by the base station.

Modulation schemes supported by the NR system include quadrature phase shift keying (QPSK), 16 quadrature amplitude modulation (QAM), 64QAM, and 256QAM, and the modulation order (Qm) thereof is 2, 4, and 6, respectively. That is, in the case of QPSK modulation, two bits can be transmitted per symbol; in the case of 16QAM, four bits can be transmitted per symbol; in the case of 64QAM, six bits can be transmitted per symbol; and in the case of 256QAM, eight bits can be transmitted per symbol. It is also possible to use a modulation scheme of 256QAM or higher according to system modification.

The up/downlink HARQ in the NR system adopts an asynchronous HARQ scheme in which the data retransmission occasion is not fixed. For example, in the case of the downlink, if the base station receives a feedback of a HARQ NACK from the UE in connection with initially transmitted data, the base station freely determines the occasion to transmit retransmission data by means of a scheduling operation. The UE decodes received data for an HARQ operation and buffers data deemed to be erroneous as a result of the decoding. Thereafter, the UE may combine the same with data retransmitted from the base station. HARQ ACK/NACK information of the PDSCH transmitted in subframe n-k may be transmitted from the UE to the base station through the PUCCH or PUSCH in subframe n. In the case of a 5G communication system (for example, 5G), the k value may be transmitted while being included in DCI that instructs or schedules reception of the PUDSCH transmitted in subframe n-k, or the k value may be configured for the UE through an upper-level signal. The base station may configure at least one k value through an upper-level signal and may also indicate a specific k value through the DCI. The k may be determined according to the UE's HARQ-ACK processing capability, in other words, the minimum time needed by the UE to receive the PDSCH, to generate an HARQ-ACK regarding the PDSCH, and to report the same. In addition, the UE may use a predefined value or a default value before the k value is configured.

Although an NR system has been used as an example to describe the wireless communication system and the method and apparatus proposed in embodiment, the content of the disclosure is not limited to the NR system, but is applicable to various wireless communication systems such as LTE, LTE-A, LTE-A-Pro, and 5G. In addition, although the content of the disclosure will be described with regard to a system and a device that transmit/receive signals by using an unlicensed band, the content of the disclosure will also be applicable to systems operating in licensed bands.

As used herein, upper-level signaling or an upper-level signal refers to a method for delivering signals from a base station to a UE by using a physical-layer downlink data channel, or from the UE to the base station by using a physical-layer uplink data channel, and includes methods for delivering signals through radio resource control (RRC) signaling, packet data convergence protocol (PDCP) signal, or a media access control (MAC) control element (MAC CE). In addition, the upper-level signaling or upper-level signal may include system information (for example, system information block (SIB)) commonly transmitted to multiple UEs.

In the case of a system performing communication in an unlicensed band, a transmitting device (base station or UE) that wants to transmit signals through the unlicensed band performs a channel access procedure (or listen before tank (LBT)), before transmitting the signals, with regard to the unlicensed band through which communication is to be performed, and if it is determined according to the channel access procedure that the unlicensed band is idle, may access the unlicensed band, thereby performing signal transmission. If it is confirmed according to the performed channel access procedure that the unlicensed band is not idle, the transmitting device cannot perform signal transmission.

In general, during a channel access procedure in an unlicensed band, the transmitting device may measure the intensity of a signal received through the unlicensed band for a fixed time or for a time calculated according to a predefined rule (for example, time calculated at least through one random value selected by the base station or the UE) and may compare the intensity of the received signal with a threshold value defined in advance or acquired by a function including at least one variable from among the channel bandwidth or the signal bandwidth through which a signal to be transmitted is transmitted, the intensity of transmission power, and the like, thereby determining whether or not the unlicensed band is idle.

For example, the transmitting device may measure the signal intensity for Xus (for example, 25 us) immediately before the time to transmit signals. If the measured signal intensity is lower than a predefined or calculated threshold value T (for example, −72 dBm), the transmitting device may determine that the unlicensed band is idle and may transmit the configured signal. The maximum time for which continuous signal transmission is possible after the channel access procedure may be limited according to the maximum channel occupancy time defined for each nation/region/frequency band according to each unlicensed band, and may also be limited according to the type of the transmitting device (for example, base station, UE, master device, or slave device). For example, in the case of Japan, a base station or a UE may perform a channel access procedure in a 5 GHz unlicensed band and may transmit signals while occupying the channel, without performing an additional channel access procedure, for a maximum time of 4 ms.

More specifically, when the base station or UE wants to transmit a downlink or uplink signal through the unlicensed band, the channel access procedure that the base station or UE can perform may be at least divided into the following types and described accordingly:

Type 1: perform channel access procedure for variable time and then transmit up/downlink signal Type 2: perform channel access procedure for fixed time and then transmit up/downlink signal Type 3: transmit downlink or uplink signal without performing channel access procedure Although the case in which the base station transmits a downlink signal to the UE through the unlicensed band and the case in which the UE transmits an uplink signal to the base station through the unlicensed band will be referred to interchangeably in the following description of the disclosure, the content proposed in the disclosure can be applied identically or applied, after partial modification, to the case in which the UE transmits an uplink signal to the base station through the unlicensed band, or to the case in which the base station transmits a downlink signal to the UE through the unlicensed band. Accordingly, detailed descriptions of downlink signal transmission/reception will be omitted herein. It will also be assumed in the description of the disclosure that a single piece of downlink data information (codeword or TB) or uplink data information will be transmitted/received between the base station and the UE. However, the content proposed in the disclosure will also be applicable to a case in which the base station transmits a downlink signal to multiple UEs, or to a case in which multiple codewords or TBs are transmitted/received between the base station or the UE.

A transmitting node that wants to transmit a signal in an unlicensed band (hereinafter, referred to as a base station or a UE) may determine the channel access procedure type according to the kind of the signal to be transmitted. For example, if the base station wants to transmit a downlink signal through a channel including a downlink data channel by using an unlicensed band, the base station may perform a channel access procedure in Type 1. In addition, if the base station wants to transmit a downlink signal through a channel including no downlink data channel by using an unlicensed band, for example, in the case of synchronous signal transmission or downlink control channel transmission, the base station may perform a channel access procedure in Type 2 and may then transmit the downlink signal.

The channel access procedure type may also be determined according to the transport length of the signal to be transmitted through the unlicensed band, or the length of the time or interval for which the unlicensed band is occupied and used. In the case of Type 1, the channel access procedure can be performed for a longer time than when the channel access procedure is performed in Type 2. Accordingly, if signals are to be transmitted for a short time interval or for a time less than a reference time (for example, Xms or Y symbols), the channel access procedure may be performed in Type 2. On the other hand, if signals are to be transmitted for a long time interval or for a time longer than or equal to the reference time (for example, Xms or Y symbols), the channel access procedure may be performed in Type 1. As described above, the transmitting node may perform the channel access procedure in different types according to the unlicensed band usage time.

When a channel access procedure is performed in Type 1 based on at least one of the kind of the signal to be transmitted, the transport length of the signal to be transmitted, or the length of time or interval for which the unlicensed band is occupied and used, the channel access priority class may be determined based on the quality of service class identifier (QCI) of the signal to be transmitted through the unlicensed band, and the channel access procedure may then be performed by using at least one value among predefined configuration values, as enumerated in Table 1, with regard to the determined channel access priority class. For example, QCI 1, 2, and 4 correspond to QCI values regarding services such as conversational voice, conversational video (live streaming), and non-conversational video (buffered streaming), respectively. If a signal regarding a service that does not match with any QCI in Table 1 is to be transmitted through the unlicensed band, a value closest to a QCI in Table may be selected, and a channel access priority class related thereto may be selected.

Table 1 below enumerates mapping relations between channel access priority classes and QCIs.

TABLE 1

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

The defer duration, the set of values or sizes of the contention window (CW_p), the minimum and maximum values of the contention window (CW_min,p, CW_max,p), the maximum channel occupiable interval (T_mcot,p), or the like, according to the determined channel access priority (p), may be confirmed from Table 2.

A base station that wants to transmit a downlink signal through an unlicensed band according to various embodiments performs a channel access procedure with regard to the unlicensed band for a minimum time of T_f+m_p*T_sl. In this regard, T_f refers to a fixed sensing length value (for example, 16 us), and T_sl refers to a sensing slot length (for example, 9 us). In addition, m_p is determined according to the priority class. For example, if the channel access procedure is to be performed according to channel access priority class 3 (p=3), the size of defer duration (T_f+m_p*T_sl) necessary to perform the channel access procedure is configured by using mp=3, as illustrated in Table 2.

If it is confirmed that the unlicensed band is idle throughout the entire time of m_p*T_sl, then N=N−1 may be the case. In this regard, N is selected as an arbitrary integer value selected from values between zero and the value (CW_p) of the contention window at the occasion at which the channel access procedure is performed. For example, as illustrated in Table 2, if the channel access priority class is 3 (p=3), the minimum contention window value and the maximum contention window value are 15 and 63, respectively. If it is confirmed that the unlicensed band is idle in the defer duration and in the interval in which an additional channel access procedure is performed, the base station may transmit signals through the unlicensed band for a time of T_mcot,p (8 ms) as illustrated in Table 2.

Table 2 below enumerates channel access priority classes in the downlink. Although channel access priority classes regarding the downlink will be used in the description of the disclosure for convenience of description, the channel access priority classes in Table 2 may reused in the case of the uplink as well, or separate channel access priority classes regarding the uplink may be defined and used.

TABLE 2

| Channel Access Priority Class (p) | $m_p$ | $CW_{minp}$ | $CW_{maxp}$ | $T_{mcotp}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

The initial contention window value (CW_p) may be the minimum value (CW_min,p) of the contention window. After selecting the N value, the base station may perform a channel access procedure in interval T_sl. If it is confirmed that the unlicensed band is idle through the channel access procedure performed in interval T_sl, the base station may change the value to N=N−1. If N=0, the base station may transmit signals through the unlicensed band for a maximum time of T_mcot,p. If it is confirmed that the unlicensed band is not idle through the channel access procedure performed for time T_sl, the base station may perform the channel access procedure again without changing the N value.

The contention window value (CW_p) may be changed based on the result of receiving a downlink signal transmitted through a reference frame or a reference slot within a downlink signal transmission interval (or maximum channel occupancy time (MCOT)) at the occasion at which the base station initiates the channel access procedure, at the occasion at which the base station selects the N value to perform the channel access procedure, or immediately before the same. As described above, the base station may receive the UE's result of receiving the downlink signal transmitted through the reference subframe or reference slot, and may increase or minimize the size of the contention window (CW_p) according to the ratio Z of NACKs among the reported reception result.

Figure 2:
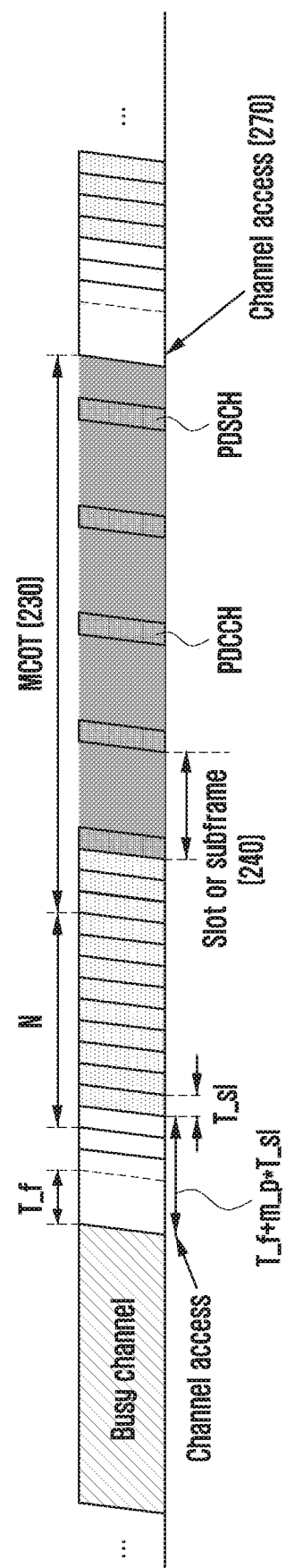
FIG. 2 is a diagram illustrating a channel access procedure in an unlicensed band according to an embodiment of the disclosure.

FIG. 2 is a diagram illustrating a channel access procedure in an unlicensed band according to an embodiment of the disclosure.

For example, referring to FIG. 2, the first transport interval 240 (hereinafter, referred to as slot or subframe) of the downlink signal transport interval 230 transmitted most recently through the unlicensed band at the occasion 270 at which the base station initiates the channel access procedure, at the occasion at which the base station selects the N value to perform the channel access procedure, or immediately before the occasion at which the channel access procedure is initiated, may be the reference slot to change the contention window for the channel access procedure 270.

If the base station cannot receive the result of receiving the downlink signal transmitted through the first slot (or subframe) 240 of the downlink signal transport interval 230, the first slot (or subframe) of the most recent downlink signal transport interval transmitted before the downlink signal transport interval 230 becomes the reference slot (or subframe). For example, the case wherein the result of receiving the downlink signal transmitted through the first slot 240 of the downlink signal transport interval 230 cannot be received may include a case wherein the time interval between the first subframe and the occasion 270 at which the base station initiates the channel access procedure is equal to or less than a predetermined or configured (n) slots or subframes, a case wherein the base station initiates the channel access procedure before the time at which the UE can report the result of receiving the downlink data channel with regard to the first slot (or subframe) 240, and the like.

As described above, if the base station cannot receive, from the UE, the result of receiving the downlink signal transmitted through the reference slot (or subframe) 240 at the occasion 270 at which the base station initiates the channel access procedure, at the occasion at which the base station selects the N value to perform the channel access procedure, or immediately before the occasion at which the base station initiates the channel access procedure, then the base station may determine that, among the reception results regarding the downlink data channel already received from the UEs, the first slot or subframe of the most recently transmitted downlink signal transport interval is the reference slot or subframe.

In addition, the base station may determine the contention window size used for the channel access procedure 270 by using the reception results received from the UEs with regard to the downlink signal transmitted through the reference slot or subframe.

For example, the base station may perform a channel access procedure by using the minimum value (CW_min,p) of the contention window configured through the channel access priority class 3 (p=3), as described in Table 2, as the initial value (CW_p=15) of the contention window, and may transmit a downlink signal through the same. If it is determined that 80% or more of the UE's reception results with regard to the downlink signal transmitted through the first subframe, among downlink signals transmitted through the unlicensed band, are NACKs, then the base station may increase the contention window from the initial value (CW_p=15) to the next contention window value (CW_p=31).

In addition, if it is not determined that 80% or more of the reception results of the UE are NACKs, for example, the base station may maintain the contention window value as the existing value or may change the contention window value to the initial value. The above-mentioned contention window change may be commonly applied to all channel access priority classes, or may be applied only to the channel access priority class used for the channel access procedure.

With regard to a downlink signal transmitted through a reference subframe or reference slot for determining a contention window size change, a reception result useful for determining the contention window size change may be determined, among results of receiving the downlink signal transmitted or reported to the base station by the UE, in the following manner:

For example, a reception result determined as a NACK, among reception results transmitted or reported to the base station by the UE, may be configured as an effective reception result used to determine the contention window size change. The base station may determine the ratio of effective reception results among the entire reception results as a Z value, and may use the same to change or increase the contention window size.

That is, if the base station transmits at least one codeword or TB to at least one UE through the reference subframe or reference slot, the base station may configure the ratio of NACKs among the results of receiving the TB transmitted through the reference subframe or reference slot, transmitted or reported by the UE, as the Z value.

For example, if two codewords or two TBs are transmitted to one UE through the reference subframe or reference slot, the base station receives a downlink data signal reception result, with regard to the two TBs, transmitted or reported by the UE. If the ratio (Z) of NACKs among the two reception results is equal to or larger than a threshold value (for example, $Z_{TH}$=80%) defined in advance or configured between the base station and the UE, the base station may change or increase the contention window size.

If the UE bundles downlink data reception results regarding at least one subframe (for example, M subframes), including the reference subframe or reference slot, and transmits or reports the same to the base station, then the base station may determine that the UE has transmitted M reception results. In addition, the base station may determine that the ratio of NACKs among the M reception results is the Z value, and may change, maintain, or initialize the contention window size.

If a downlink signal reception result is a reception result related to the second slot among two slots constituting one subframe, the ratio of NACKs among the UE's results of receiving downlink signals transmitted through the reference subframe (in other words, second slot) and the next subframe may be determined as the Z value.

If scheduling information regarding a downlink data channel or downlink control information is transmitted through the same cell or frequency band as the cell or frequency band through which the downlink data is transmitted (for example, in the case of self-scheduling), the base station according to various embodiments may determine that the UE's reception result is an NACK according to a predetermined reference, thereby determining the Z value.

In addition, even if scheduling information regarding a downlink data channel or downlink control information is transmitted through an unlicensed band, but is transmitted in a cell (or frequency) different from the cell in which the downlink data is transmitted (for example, in the case of cross-scheduling), the base station according to various embodiments may determine that the UE's reception result is an NACK according to a predetermined reference, thereby determining the Z value.

For example, if it is determined that the UE has transmitted no result of receiving downlink data through the reference subframe or reference slot, the base station may determine that the UE's reception result is an NACK according to a predetermined reference, thereby determining the Z value.

Alternatively, if it is determined that a downlink data reception result transmitted by the UE includes discontinuous transmission (DTX), NACK/DTX, or any state (for example, including RRC inactive state or RRC idle state), the base station may determine that the UE's reception result is an NACK according to a predetermined reference, thereby determining the Z value.

In addition, if scheduling information regarding a downlink data channel transmitted by the base station or downlink control information is transmitted through a licensed band, and if it is determined that a downlink data reception result transmitted by the UE includes DTX, NACK/DTX, or any state, the base station may determine that the UEs' reception result is ineffective, and may not have the same included in the contention window change reference value Z, that is, the base station may ignore the UE's reception result and then determine the Z value.

In addition, if the base station transmits scheduling information regarding a downlink data channel or downlink control information through a licensed band, the base station may ignore reception results transmitted or reported by the UE with regard to a downlink signal that the base station has not actually transmitted (no transmission), among reception results transmitted or reported to the base station by the UE with regard to a downlink signal transmitted through a reference subframe or reference slot, and may then determine the Z value.

In 5G systems, the frame structure needs to be defined and operated flexibly in view of various services and requirements. For example, it may be considered that each service has a different subcarrier spacing according to the requirement. Multiple subcarrier spacings can be currently supported in 5G systems, and each subcarrier spacing may be determined based on Equation 1 below:

$$\Delta f = f_0 2^m \qquad \text{Equation 1}$$

wherein $f_0$ refers to a basic subcarrier spacing of the system, and m refers to an integer scaling factor. For example, if $f_0$ is 15 kHz, the set of subcarrier spacings that a 5G communication system can have may include 3.75 kHz, 7.5 kHz, 15 kHz, 30 kHz, 60 kHz, 120 kHz, 240 kHz, 480 kHz, and the like. Available subcarrier spacing sets may differ depending on the frequency band. For example, in a frequency band of 6 GHz or less, 3.75 kHz, 7.5 kHz, 15 kHz, 30 kHz, 60 kHz may be used; and in a frequency band of 6 GH or higher, 60 kHz, 120 kHz, 240 kHz may be used.

The length of an OFDM symbol may vary depending on the subcarrier spacing constituting the OFDM symbol. This is because the subcarrier spacing and the OFDM symbol length are inversely proportional to each other, which is a characteristic feature of OFDM symbols. For example, if the subcarrier spacing doubles, the symbol length becomes half; if the subcarrier spacing becomes half, the symbol length doubles.

Next, a resource area in which a data channel is transmitted in a 5G communication system will be described.

Figure 3:
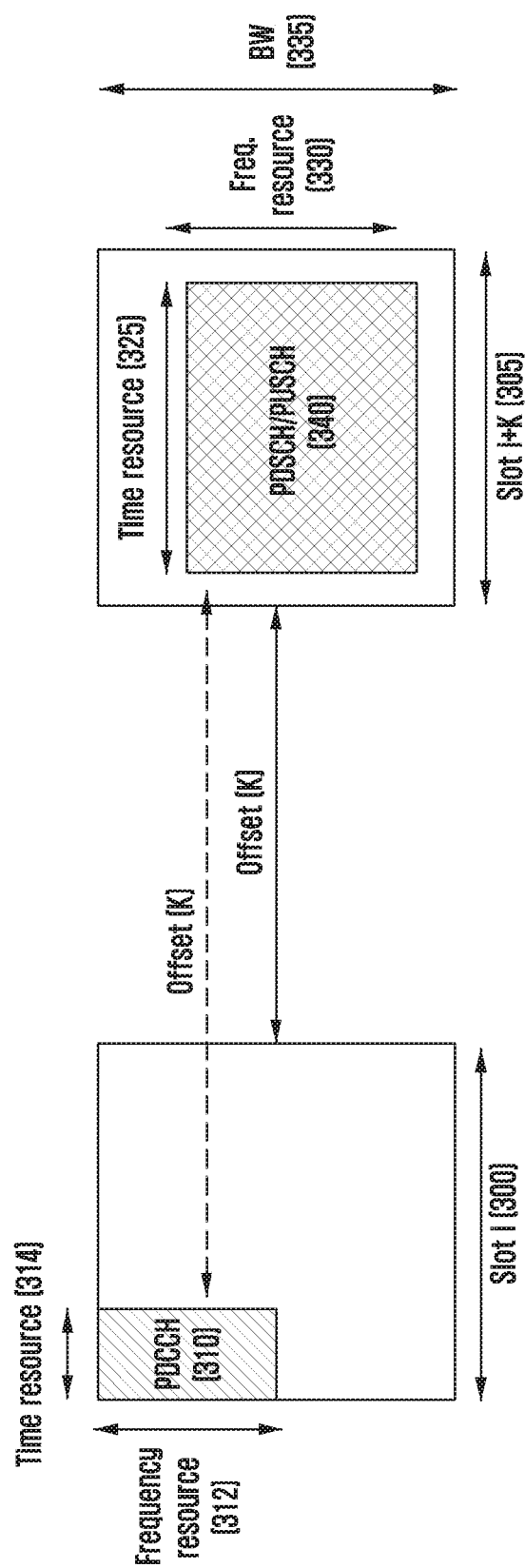
FIG. 3 is a diagram illustrating a downlink/uplink scheduling method and a resource area in an NR system according to an embodiment of the disclosure.

FIG. 3 is a diagram illustrating a resource area in which a data channel is transmitted in a 5G communication system according to an embodiment of the disclosure.

The UE monitors or searches for a PDCCH 310 in a PDCCH area (hereinafter, referred to as control resource set (CORESET) or search space (SS)) configured by the base station through an upper-level signal. The PDCCH area includes time-domain 314 and frequency-domain 312 information. The time-domain 314 information may be configured with regard to each symbol, and the frequency-domain 312 information may be configured with regard to each RB or RB group.

If the UE detects the PDCCH 310 in slot i 300, the UE acquires downlink control information (DCI) transmitted through the detected PDCCH 310. The UE may acquire scheduling information regarding the downlink data channel or uplink data channel through the received DCI.

For example, the DCI may include resource area (or PDSCH transport area) information regarding the downlink data channel (PDSCH), or resource area information assigned from the base station to transmit the PUSCH.

If PUSCH transmission has been scheduled for the UE, the UE may acquire slot index-related information or offset information (K) for transmitting the PUSCH, based on the received DCI, and may determine the slot index to transmit the PUSCH, based on the information.

For example, by using offset information (K) received with reference to slot index i 300 used to receive the PDCCH 310, the UE may determine that transmission of a PUSCH in slot i+K 305 has been scheduled. With reference to the CORESET used to receive the PDCCH 310, the UE may also determine slot i+K 305 or the PUSCH starting symbol or time in slot i+K through offset information K. In addition, the UE may acquire information regarding the PUSCH transmission time-frequency resource area 340 in the PUSCH transport slot 305 based on the DCI.

The PUSCH transmission frequency resource area information 330 may be PRB or PRB group-based information. The PUSCH transmission frequency resource area information 330 may include an area included in the initial uplink bandwidth (BW) 335 confirmed or configured through an initial access procedure, or an initial uplink bandwidth part (BWP).

For example, if the uplink bandwidth (BW) or uplink bandwidth part (BWP) is configured for the UE through an upper-level signal, the PUSCH transmission frequency resource area information 330 may be an area included in the uplink bandwidth configured through the upper-level signal, or uplink bandwidth part.

PUSCH transmission time resource area information 325 may be symbol or symbol group-based information or information indicating absolute time information. The PUSCH transmission time resource area information 325 may be expressed as a combination of the PUSCH t transmission starting time or symbol and the PUSCH length or PUSCH ending time or symbol, and may be included in the DCI as a field or value. The UE may transmit the PUSCH in the PUSCH transmission resource area 340 determined through the DCI. If PDSCH transmission has been scheduled for the UE, the DCI may include resource area (or PDSCH transmission area) information for receiving the PDSCH transmitted from the base station, and the UE may receive the PDSCH in the PDSCH reception resource area 340 determined through the DCI.

The control area in the 5G described above may be configured through upper-layer signaling (for example, system information, master information block (MIB), radio resource control (RRC) signaling). The statement that the control area is configured for the UE may means that information such as the control area identity, the frequency position in the control area, and the control area's symbol length is provided.

Figure 4:
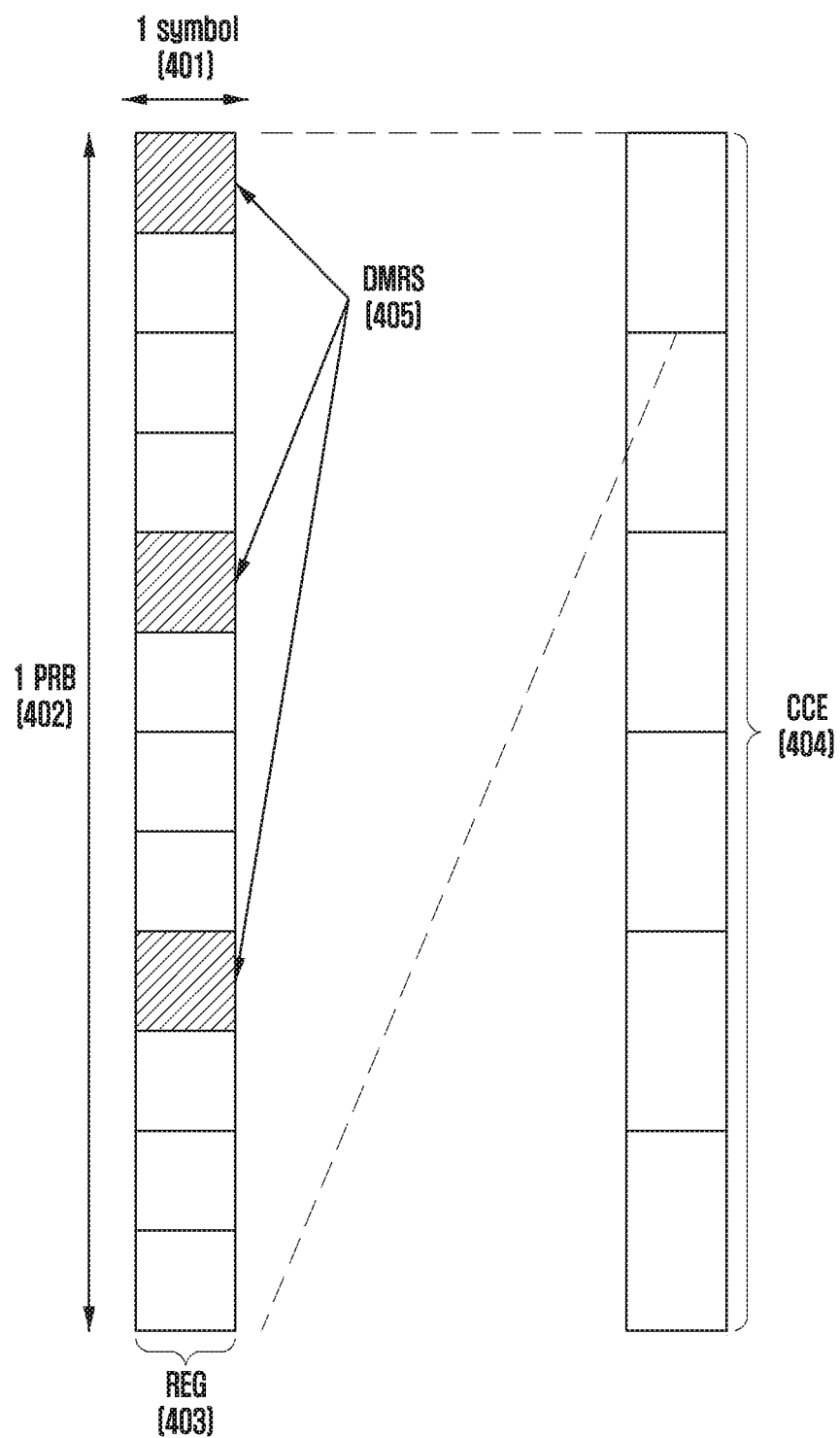
FIG. 4 is another diagram illustrating a downlink/uplink scheduling method and a resource area in an NR system according to an embodiment of the disclosure.

FIG. 4 is a diagram illustrating an example of basic units of time and frequency resources constituting a downlink control channel that can be used in the 5G according to an embodiment of the disclosure.

Referring to FIG. 4, the basic unit of time and frequency resources constituting a control channel is referred to as a resource element group (REG) 403, and the REG 403 may be defined by one OFDM symbol 401 along the time axis and one physical resource block (PRB) 402 along the frequency axis, that is, twelve subcarriers. A series of the REGs 403 may constitute a downlink control channel assignment unit.

Assuming that the basic unit for assigning a downlink control channel in the 5G is a control channel element (CCE) 404 as illustrated in FIG. 4, one CCE 404 may include multiple REGs 403. Taking, for example, the REG 403 illustrated in FIG. 4, the REG 403 may include twelve REs, and this means that, if one CCE 404 includes six REGs 403, one CCE 404 may include 72 REs. After the downlink control area is configured, the corresponding area may include multiple CCEs 404, and a specific downlink control channel may be mapped to one CCE 404 or multiple CCEs 404 and then transmitted, according to the aggregation level (AL) in the control area. The CCEs 404 in the control area are distinguished by numbers, which may be assigned according to a logical mapping scheme.

The basic unit of the downlink control channel illustrated in FIG. 4, that is, REG 403, may include both REs to which DCI is mapped, and an area in which a demodulation reference signal (DMRS) 405 (reference signal for decoding the same) is mapped. As in FIG. 4, three DMRSs 405 may be transmitted within one REG 403.

The number of CCEs necessary to transmit a PDCCH may be 1, 2, 4, 8, 16 according to the aggregation level (AL), and different CCE numbers may be used to implement link adaptation of the downlink control channel. For example, if AL=L, one downlink control channel may be transmitted through L CCEs.

The UE needs to detect signals without information regarding the downlink control channel, and a search space, which refers to a set of CCEs, is used to aid such blind decoding. The search space is a set of downlink control channel candidates including CCEs that the UE needs to try decoding at a given aggregation level, and the UE has multiple search spaces because 1, 2, 4, 8, or 16 CCEs constitute a bundle according to various aggregation levels. A search space set may be defined as a set of search spaces at all configured aggregation levels.

Search spaces may be classified into common search spaces and UE-specific search spaces. A group of UEs or all UEs may search for a common search space of a PDCCH in order to receive common control information, such as dynamic scheduling related to system information or a paging message.

For example, PDSCH scheduling assignment information for transmitting an SIB, including cell provider information or the like, may be received by searching for a common search space of the PDCCH. A common search space may be defined as a pre-promised set of CCEs because a group of UEs or all UEs need to receive the PDCCH. In addition, scheduling assignment information regarding a UE-specific PDSCH or PUSCH may be received by searching for a UE-specific search space of the PDCCH. The UE-specific search space may be defined UE-specifically as a function of the UE's identify and various system parameters.

Parameters regarding a search space of a PDCCH in the 5G may be configured for the UE by the base station through upper-layer signaling (for example, SIB, MIB, RRC signaling). For example, the base station may configure, for the UE, the number of PDCCH candidates at each aggregation level L, the monitoring period related to the search space, the occasion for symbol-based monitoring inside the slot regarding the search space, the search space type (common search space or UE-specific search space), a combination of a DCI format and a RNTI to be monitored in the corresponding search space, the index of the control area for monitoring the search space, and the like. For example, the parameters may include the following pieces of information:

TABLE 3

```
SearchSpace ::=                      SEQUENCE {
  -- Identity of the search space. SearchSpaceId = 0 identifies the
     SearchSpace configured via PBCH (MIB) or ServingCellConfigCommon.
  searchSpaceId                      SearchSpaceId,
  controlResourceSetId               ControlResourceSetId,
  monitoringSlotPeriodicityAndOffset    CHOICE {
    sl1                              NULL,
    sl2                              INTEGER (0..1),
    sl4                              INTEGER (0..3),
    sl5                              INTEGER (0..4),
```

TABLE 3-continued

```
    sl8                         INTEGER (0..7),
    sl10                        INTEGER (0..9),
    sl16                        INTEGER (0..15),
    sl20                        INTEGER (0..19)
}
monitoringSymbolsWithinSlot     BIT STRING (SIZE (14))
nrofCandidates                  SEQUENCE {
    aggregationLevel1           ENUMERATED {n0, n1, n2, n3, n4, n5,
    n6, n8},
    aggregationLevel2           ENUMERATED {n0, n1, n2, n3, n4, n5,
    n6, n8},
    aggregationLevel4           ENUMERATED {n0, n1, n2, n3, n4, n5,
    n6, n8},
    aggregationLevel8           ENUMERATED {n0, n1, n2, n3, n4, n5,
    n6, n8},
    aggregationLevel16          ENUMERATED {n0, n1, n2, n3, n4,
    n5, n6, n8}
},
searchSpaceType                 CHOICE {
    -- Configures this search space as common search space (CSS) and DCI
    formats to monitor.
    common                      SEQUENCE {
    }
    ue-Specific                 SEQUENCE {
    -- Indicates whether the UE monitors in this USS for DCI formats 0-0
    and 1-0 or for formats 0-1 and 1-1.
        formats                 ENUMERATED {formats0-0-And-1-0,
    formats0-1-And-1-1),
        ...
    }
}
```

According to the above configuration information, the base station may configure one or multiple search space sets for the UE. For example, the base station may configure search space set 1 and search space set 2, may configure such that DCI format A scrambled with X-RNTI in search space set 1 is monitored in the common search space, and may configure such that DCI format B scrambled by Y-RNTI in search space set 2 is monitored in the UE-specific search space.

According to the above configuration information, one or multiple search space sets may exist in the common search space or UE-specific search space. For example, search space set #1 and search space set #2 may be configured as common search spaces, and search space set #3 and search space set #4 may be configured as UE-specific search spaces.

In a common search space, the following combinations of DCI formats and RNTIs may be monitored:
  DCI format 0_0/1_0 with CRC scrambled by C-RNTI, CS-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI
In a UE-specific search space, the following combinations of DCI formats and RNTIs may be monitored:
  DCI format 0_0/1_0 with CRC scrambled by C-RNTI, CS-RNTI, TC-RNTI
  DCI format 1_0/1_1 with CRC scrambled by C-RNTI, CS-RNTI, TC-RNTI
The RNTIs enumerated above may follow the following definition and usage:
  C-RNTI (Cell RNTI): UE-specific PDSCH scheduling usage
  TC-RNTI (Temporary Cell RNTI): UE-specific PDSCH scheduling usage
  CS-RNTI (Configured Scheduling RNTI): quasi-statically configured UE-specific PDSCH scheduling usage
  RA-RNTI (Random Access RNTI): PDSCH scheduling usage in random access step
  P-RNTI (Paging RNTI): PDSCH scheduling usage for paging transmission
  SI-RNTI (System Information RNTI): PDSCH scheduling usage for system information transmission
  INT-RNTI (Interruption RNTI): usage for indicating whether or not puncturing regarding PDSCH exists
  TPC-PUSCH-RNTI (Transmit Power Control for PUSCH RNTI): usage for indicating power adjustment command regarding PUSCH
  TPC-PUCCH-RNTI (Transmit Power Control for PUCCH RNTI): usage for indicating power adjustment command regarding PUCCH
  TPC-SRS-RNTI (Transmit Power Control for SRS RNTI): usage for indicating power adjustment command regarding SRS Multiple search space sets may be configured for different parameters (for example, DCI format) in the 5G, and the group of search space sets monitored by the UE at each occasion may vary. For example, if search space set #1 is configured for X-slot period, if search space set #2 is configured for Y-slot period, and if X and Y differ from each other, then the UE may monitor both search space set #1 and search space set #2 in a specific slot and may monitor one of search space set #1 and search space set #2 in another specific slot.

If multiple search space sets are configured for the UE, following conditions may be considered in connection with a method for determining search space sets to be monitored by the UE:

Condition 1: Maximum PDCCH Candidate Number Limited

The number of PDCCH candidates that can be monitored per slot does not exceed $M^\mu$. The $M^\mu$ may be defined as the maximum number of PDCCH candidates in a cell configured at a subcarrier spacing of $15.2^\mu$ kHz, and may be defined by the following table:

TABLE 4

| μ | Maximum number of PDCCH candidates per slot and per serving cell ($M^\mu$) |
|---|---|
| 0 | 44 |
| 1 | 36 |
| 2 | 22 |
| 3 | 20 |

Condition 2: Maximum CCE Number Limited

The number of CCEs constituting the entire search space (as used herein, the search space refers to the entire CCE set corresponding to multiple search space set union areas) per slot does not exceed $C^\mu$. The $C^\mu$ may be defined as the maximum number of CCEs per slot in a cell configured at a subcarrier spacing of $15.2^\mu$ kHz, and may be defined by the following table:

TABLE 5

| μ | Maximum number of CCEs per slot and per serving cell ($C^\mu$) |
|---|---|
| 0 | 56 |
| 1 | 56 |
| 2 | 48 |
| 3 | 32 |

For convenience of description, a situation satisfying both conditions 1 and 2 above at a specific occasion will be defined as "condition A". Accordingly, the statement that condition A is not satisfied may mean that at least one of conditions 1 and 2 is not satisfied.

There may occur a case that does not satisfy condition A described above at a specific occasion, according to the configuration of search space sets of the base station. If condition A is not satisfied at a specific occasion, the UE may select and monitor only some of search space sets configured to satisfy condition A at the corresponding occasion, and the base station may transmit a PDCCH by using the selected search space set.

The following method may be used to select some of all configured search space sets:

Method 1

If condition A regarding a PDCCH is not satisfied at a specific occasion (slot), the UE (or base station) may preferentially select a search space set, the search space type of which is configured as a common search space, among search space sets existing at the corresponding occasion, over a search space set configured as a UE-specific search space.

If all search space sets configured as common search spaces are selected (that is, if condition A is satisfied even after selecting all search spaces configured as common search spaces), the UE (or base station) may select search space sets configured as UE-specific search spaces. If there are multiple search space sets configured as UE-specific search spaces, a search space set having a low search space set index may have a higher priority. UE-specific search space sets may be selected, in view of the priority, as long as condition A is satisfied.

In 5G communication systems, in order to dynamically change the downlink signal transmission and the downlink signal transmission interval in a time division duplex (TDD) system, a slot format indicator (SFI) may be used to indicate whether each of OFDM symbols constituting one slot is a downlink symbol, an uplink symbol, or a flexible symbol. As used herein, a symbol indicated as a flexible symbol refers to a symbol which is neither a downlink symbol nor an uplink symbol, or which can be changed to a downlink or uplink symbol by means of UE-specific control information or scheduling information. The flexible symbol may include a gap guard necessary in the process of switching from the downlink to the uplink.

The SFI is simultaneously transmitted to multiple UEs through a UE group (or cell) common control channel. In other words, the SFI is transmitted through a PDCCH that is CRC-scrambled by an identifier (for example, SFI-RNTI) different from the UE-specific identifier (C-RNTI). The SFI may include information regarding N slots. The value of N may be an integer larger than 0 (or natural number), or may be configured by the base station for the UE through an upper-level signal from a set of predefined possible values (for example, 1, 2, 5, 10, 20). In addition, the size of the SFI information may be configured by the base station for the UE through an upper-level signal. Exemplary slot formats that the SFI may indicate are enumerated in Table 6 below:

TABLE 6

| | Example of slot format structure information | | | | | | | | | | | | | |
|---|---|---|---|---|---|---|---|---|---|---|---|---|---|---|
| | Symbol number (or index) within one slot | | | | | | | | | | | | | |
| format | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |

TABLE 6-continued

Example of slot format structure information

| format | \multicolumn{14}{c}{Symbol number (or index) within one slot} |
|---|---|---|---|---|---|---|---|---|---|---|---|---|---|---|

| format | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | D | X | U |
| 29 | D | D | D | D | D | D | D | D | D | D | D | X | X | U |
| 30 | D | D | D | D | D | D | D | D | D | D | X | X | X | U |
| 31 | D | D | D | D | D | D | D | D | D | D | X | X | U | U |
| 32 | D | D | D | D | D | D | D | D | D | X | X | X | U | U |
| 33 | D | D | D | D | D | D | D | D | X | X | X | U | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | X | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | D | X | D | D | D | D | D | D | D | X |
| 47 | D | D | D | D | X | X | D | D | D | D | D | D | X | X |
| 48 | D | D | X | X | X | X | D | D | D | D | D | X | X | X |
| 49 | D | X | X | X | X | X | D | X | X | X | X | X | X | X |
| 50 | X | U | U | U | U | U | X | U | U | U | U | U | U | U |
| 51 | X | X | U | U | U | U | X | X | U | U | U | U | U | U |
| 52 | X | X | X | U | U | U | X | X | X | U | U | U | U | U |
| 53 | X | X | X | X | U | U | X | X | X | X | U | U | U | U |
| 54 | D | D | D | D | X | U | D | D | D | D | D | X | U | U |
| 55 | D | D | X | U | U | U | D | D | X | U | U | U | U | U |
| 56 | D | X | U | U | U | U | D | X | U | U | U | U | U | U |
| 57 | D | D | D | X | X | U | D | D | D | X | X | U | U | U |
| 58 | D | D | X | X | U | U | D | D | X | X | U | U | U | U |
| 59 | D | X | X | U | U | U | D | X | X | U | U | U | U | U |
| 60 | D | X | X | X | X | U | D | X | X | X | X | U | U | U |
| 61 | D | D | X | X | X | U | D | D | X | X | X | U | U | U |
| 62-254 | \multicolumn{14}{c}{Reserved} |
| 255 | \multicolumn{14}{l}{UE determines the slot format for the slot based on tdd-UL-DL-ConfigurationCommon, tdd-UL-DL-ConfigurationCommon2, or tdd-UL-DL-ConfigDedicated and, if any, on detected DCI formats} |

In table 6, D refers to a downlink, U refers to an uplink, and X refers to a flexible symbol. The total number of formats that can be supported in Table 6 is 256. The maximum size of SFI information bits in the current NR system is 128 bits, and the SFI information bits correspond to a value that the base station can configure for the UE through an upper-level signal (for example, dci-Payload-Size). The SFI information may include slot formats regarding multiple serving cells, and may be distinguished through serving cell ID. In addition, a combination of SFIs regarding one or more slots (slot format combination) may be included with regard to each serving cell.

As used herein, the term "SFI" may also include an SFI combination including at least one SFI.

For example, if SFI information bit size is 3 bits, and if the SFI is configured for one serving cell, the three-bit SFI information may constitute a total of eight SFIs or SFI combinations (hereinafter, SFIs), and the base station may indicate one of the eight SFIs through UE group common DCI (hereinafter, referred to as SFI information). At least one of the eight SFIs may be configured as an SFI regarding multiple slots. For example, in Table 7, five pieces of information (slot format combination DI 0, 1, 2, 3, 4) of Table 6 are SFIs regarding one slot, and the remining three correspond to information regarding SFIs regarding four slots (slot formation combination ID, 5, 6, 7), and are successively applied to four slots.

TABLE 7

Example of SFI information

| Slot format combination ID | Slot Formats |
|---|---|
| 0 | 0 |
| 1 | 1 |
| 2 | 2 |
| 3 | 19 |
| 4 | 9 |
| 5 | 0 0 0 0 |

TABLE 7-continued

Example of SFI information

| Slot format combination ID | Slot Formats |
|---|---|
| 6 | 1 1 1 1 |
| 7 | 2 2 2 2 |

In the case of a 5G communication system, an uplink signal may be transmitted without uplink scheduling information, in order to provide various services and to support a high data transmission rate. More specifically, if an uplink signal is to be transmitted without uplink scheduling information, information such as resource assignment for uplink transmission and MCS may be configured through RRC signaling or DCI of PDCCH. The uplink transmission may be at least divided into the following types according to the uplink transmission configuration reception type and described accordingly:

Type 1: uplink transmission configuration using RRC signaling

Figure 5A:
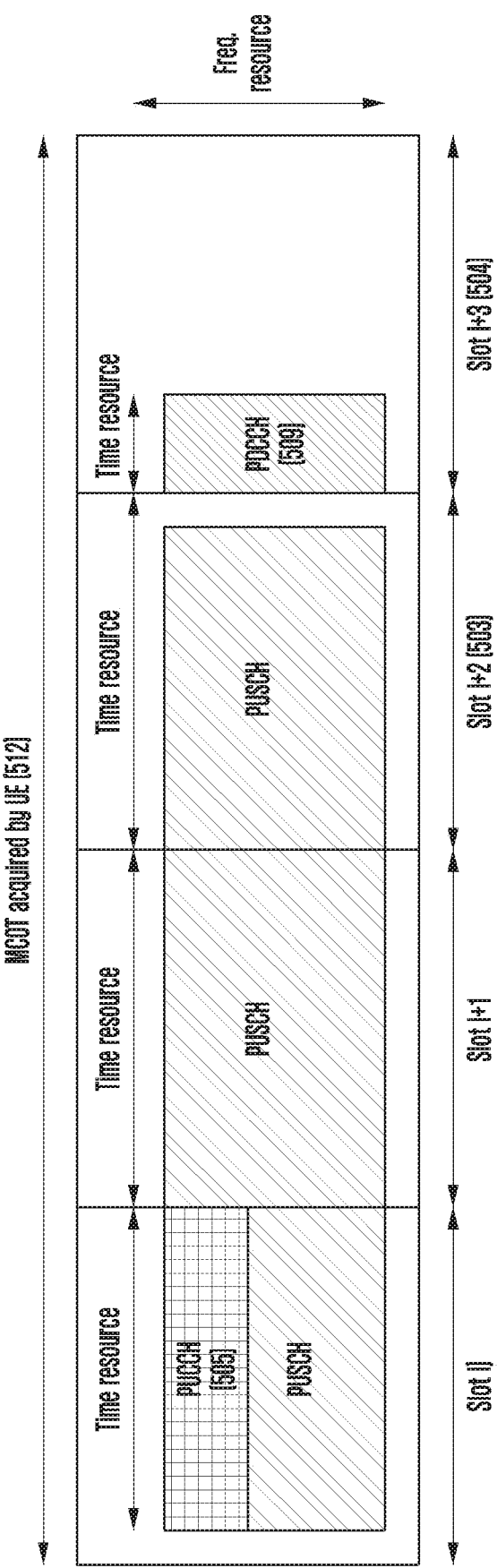
FIG. 5A is a diagram illustrating the structure of a downlink control channel in 5G according to an embodiment of the disclosure.
Figure 5B:
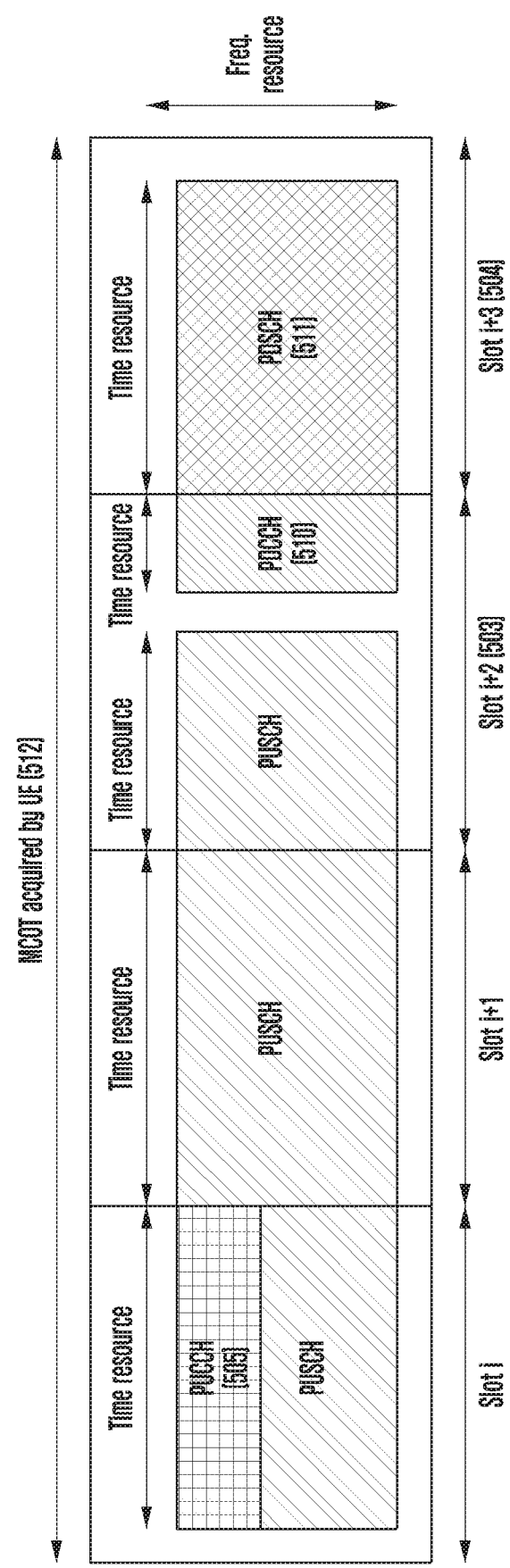
FIG. 5B is a diagram illustrating the structure of a downlink control channel in 5G according to an embodiment of the disclosure.

Type 2: uplink transmission configuration using physical-layer downlink control channel FIGS. 5A and 5B are diagrams illustrating a case in which an uplink signal is transmitted without uplink scheduling information in an unlicensed band according to various embodiments of the disclosure.

A channel access procedure may be performed to transmit an uplink signal without uplink scheduling information in an unlicensed band. If the UE accesses the unlicensed band by performing a channel access procedure for a variable time, the UE may schedule, for the base station, the last slot 504 or last subframe 504 within the maximum channel occupancy time 512, for the purpose of downlink transmission, by using a channel occupancy time sharing indicator included in uplink control information 505. The base station determines channel access by performing a channel access procedure for a fixed time, and the UE may configure the last one symbol of the slot 503 or subframe 503 for uplink transmission as a gap guard emptied for the channel access procedure of the base station.

Downlink transmission may be limited to downlink control information transmission through the PDCCH 509 as in FIG. 5A, and the starting symbol of the PDCCH 509 may be limited to the first symbol of the last slot 504 or last subframe 504, and may have a symbol length of two or less. However, the scope of the disclosure is not limited thereto.

Since downlink transmission time resource area information in a 5G communication system is determined through the DCI, the transmission starting time or symbol of the PDCCH 510, the length of the PDSCH 511, and the ending time or the symbol thereof may be variously configured as in FIG. 5B.

Meanwhile, a UE in a 5G communication system may monitor or search for a PDCCH in a downlink control channel (CORESET or SS) configured by the base station through upper-level signaling. If the base station is to transmit a downlink signal within the maximum channel occupancy time acquired by the UE, the PDCCH transmission starting time may be limited by the downlink control channel configuration configured by the base station for the UE. Accordingly, in order to improve the downlink signal transmission efficiency within the maximum channel occupancy time acquired by the user, the control area configuration method needs to be changed according to downlink signal transmission.

Accordingly, the disclosure seeks to propose a method wherein, if a base station and a UE are configured to receive or transmit a downlink signal or an uplink signal in an unlicensed band, a PDCCH or PDSCH is transmitted/received within a maximum channel occupiable time acquired by the UE. More specifically, the disclosure proposes a method and an apparatus wherein a UE instructs (or changes or adjusts) control channel configuration information for PDCCH reception to the base station.

The method and apparatus proposed in the following embodiments are not limitedly applied to each embodiment, and all of the at least one embodiment proposed in the disclosure or a combination of some embodiments may be used and applied to a method and an apparatus for configuring or determining a control channel for PDCCH monitoring or search. In addition, although it will be assumed in the description of embodiments that the UE performs PUSCH transmission by receiving a configuration thereof from the base station through an upper-level signal configuration without receiving DCI, as in the case of semi-persistent scheduling (SPS) or grant-free (or configured grant) transmission, the description is also applicable to a case in which the UE receives scheduling of PDSCH reception or PUSCH transmission from the base station through DCI. Moreover, although it will be assumed in the description of embodiments that the base station and the UE operate in an unlicensed band, the method and apparatus proposed in the embodiments are also applicable to a base station and a UE operating in a licensed band or shared spectrum, besides the unlicensed band.

Embodiment 1

An embodiment proposes a method wherein, in connection with a base station and a UE operating in an unlicensed band, a downlink resource area to be shared by the UE is determined based on control channel information configured by the base station for the UE in order to monitor or search for the PDCCH of the UE.

Figure 6:
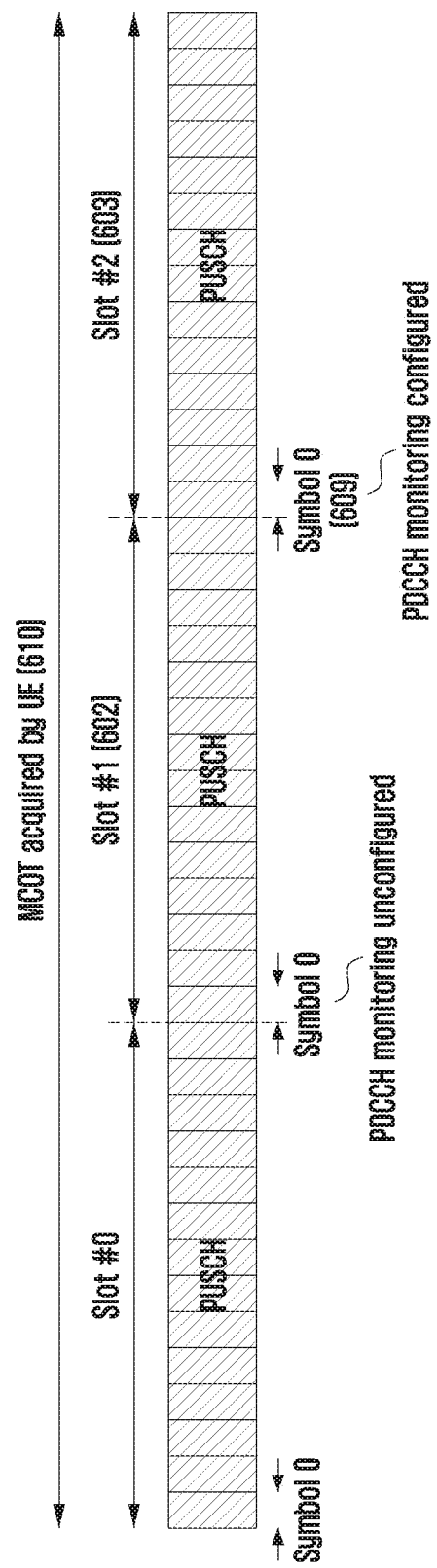
FIG. 6 is a diagram illustrating a method for determining a downlink resource area to be shared by a UE according to an embodiment of the disclosure.

FIG. 6 is a diagram illustrating a method for determining a downlink resource area to be shared by a UE according to an embodiment of the disclosure.

Referring to FIG. 6, in connection with a base station and a UE transmitting/receiving signals in an unlicensed band, it will be assumed that the UE is configured to perform PUCCH/PUSCH transmission in at least one slot through a grant-free (or configured grant) configuration. The UE may perform a channel access procedure (for example, Type 1 channel access procedure) and may then share (or instruct) a part of the acquired maximum channel occupancy interval 610 with (or to) the base station such that the base station can use the same for downlink signal transmission. To this end, the UE may transmit time information of a resource that the base station may use for downlink signal transmission (for example, at least one of the base station's downlink signal transmission initiating time and possible downlink signal transmission time information) to the base station by using uplink control information.

In connection with transmitting the time information, the UE may use configured control channel information. In the embodiment, the configured control channel information denotes control channel configuration information configured to transmit/receive normal control information, and may hereinafter be referred to as first control channel configuration information. That is, the UE may indicate that downlink signal transmission may be performed from a slot and a symbol determined based on control channel information configured to transmit/receive normal control information. For example, if the first symbol 609 of slot #2 603 is configured for the UE through control channel information for PDCCH reception, and if slot #1 602 is not configured therefor, then the UE may instruct the base station to transmit a downlink signal from the first symbol 609 of slot #2 603. In other words, the UE cannot instruct downlink signal transmission after the first symbol 609 of slot #1 602 or slot #2 603. The method is advantageous in that the UE can instruct downlink signal transmission by using configured information only, but has a drawback in that the same is limited to control channel information for which downlink signal transmission is configured.

Embodiment 2

The embodiment proposes a method wherein, with regard to a base station and a UE operating in an unlicensed band, the UE requests the base station to provide control channel configuration information for monitoring or searching for a PDCCH.

Operations of the embodiment will now be described with reference to FIG. 7.

Figure 7:
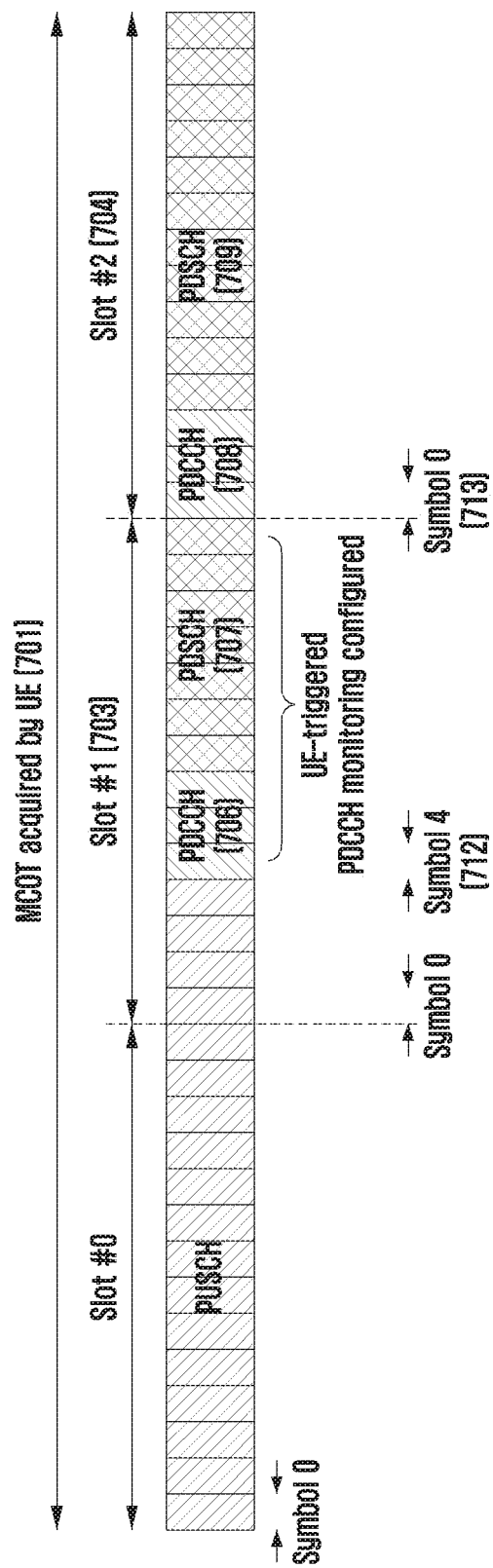
FIG. 7 is a diagram illustrating a method for requesting, by a UE, a base station to provide control channel configuration information for PDCCH monitoring according to an embodiment of the disclosure.

FIG. 7 is a diagram illustrating a method for requesting, by a UE, a base station to provide control channel configuration information for PDCCH monitoring according to an embodiment of the disclosure.

It will be assumed, in connection with a base station and a UE transmitting/receiving signals in an unlicensed band, that the UE is configured to transmit/receive a PUCCH/PUSCH in at least one slot through a grant-free (or configured grant) configuration. The UE may assign a part of a maximum channel occupancy interval 701 acquired by using uplink control information to resource areas 706, 707, 708, and 709 for downlink transmission of the base station. The UE may transmit, to the base station, information regarding a control channel to be used for temporary PDCCH monitoring or searching in the starting slot (or symbol) of a resource for downlink transmission. Information regarding the control channel may use configuration information regarding control channels configured to transmit normal control information to the UE as described with reference to FIG. 6 (first control channel configuration information), or may use configuration information regarding control channels separately configured according to the method proposed in the disclosure (second control channel configuration information). Accordingly, the UE may transmit, to the base station, information indicating a control channel to be used for the downlink among configured control channels.

For example, if the UE instructs downlink transmission from the fifth symbol (Symbol 4) 712 of slot #1 703 to the base station, the UE may perform PDCCH monitoring and search in each symbol from the fifth symbol (Symbol 4) 712 of slot #1 703, and the base station may transmit control information through the PDCCH based on information regarding the control channel.

Accordingly, in order for the UE to temporarily perform PDCCH monitoring or search, a control channel (CORESET or search space) regarding the same needs to be configured. Hereinafter, various embodiments for configuring the control channel information will be proposed.

(2-1)$^{th}$ Embodiment

If a part of a maximum channel occupancy interval acquired by a UE is shared with the base station (that is, if some resources are used as the downlink), the base station may configure at least one piece of separate control channel information (second control channel information) for the UE's PDCCH monitoring or search. For example, the base station may configure CORESET configuration information (for example, configuration information regarding CORESET #X) and search space configuration information (for example, configuration information regarding search space set #Y) as the control channel information. The control channel information may be used when requesting or instructing the UE's PDCCH monitoring or search configuration. However, the embodiment is not limited thereto, and the UE may select information indicating control channel information for PDCCH monitoring from first control channel information and may transmit the same to the base station as described above.

Parameters of CORESET #X or search space set #Y may be configured through upper-layer signaling, may include at least one piece of information from among the number of PDCCH candidates at aggregation level L, the occasion for symbol-based monitoring inside a slot related to a search space, the search space type, and a combination of a DCI format and a RNTI to be monitored in the corresponding search space, and may be configured as a value by which the maximum occasion can be secured without exceeding the number of PDCCH candidates that can be monitored per slot.

For example, the base station may instruct, symbol by symbol, a symbol-based monitoring occasion inside the slot related to search space set #Y. The symbol-based occasion may be configured as a 14-bit bitmap. In addition, the base station may also configure inside-slot symbol-based monitoring occasion information through bit signaling that may include information regarding the downlink resource's starting slot and the offset with the starting symbol, and this information may be included in search space set #Y. For example, if the offset information indicator is 2-bit signaling as in Table 8, and if the offset information indicator is 11, the UE may perform each symbol PDCCH monitoring or search from symbol #3.

TABLE 8

| Bits | Information |
| --- | --- |
| 00 | #0 |
| 01 | #1 |
| 10 | #2 |
| 11 | #3 |

(2-2)$^{th}$ Embodiment

The embodiment proposes a method for configuring control channel information in a situation in which the number of CORESETs or search spaces is limited. If the number of CORESETs or search spaces is limited, the base station may temporarily change at least one of configured CORESET or search space set configurations as a control channel configuration. To this end, the index of the CORESET or search space to be changed may be preconfigured through upper-level signaling, or a CORESET or search space set having the lowest or highest index may be selected. Alternatively, the selected CORESET or search space set may be transmitted to the base station through uplink control information. Configuration information regarding the selected CORESET or search space set may be temporarily changed to a value by which the maximum PDCCH monitoring or search occasion can be secured, similarly to the scheme as described in the above embodiment.

(2-3)$^{th}$ Embodiment

If the UE transmits an instruction regarding a PDCCH monitoring or search configuration to the base station, the UE may configure at least one of configured CORESETs or search space sets for the purpose of PDCCH monitoring or search. To this end, the UE may add at least one of the following pieces of configuration information for CORE-SETs or search spaces to uplink control information:

Search space index
CORESET index for search space monitoring
Number of PDCCH candidates at aggregation level L of search space
Symbol-based monitoring occasion inside slot regarding search space
Combination of DCI format and RNTI to be monitored in corresponding search space The UE may transmit uplink control information including above configuration information to the base station, and may perform PDCCH monitoring or search based on the configured control channel information.

In connection with performing the Embodiment 2, if the UE has transmitted information instructing a PDCCH monitoring or search configuration to the base station, the occasion (or control channel) for PDCCH monitoring or search according to the instruction and the occasion (or control channel) configured for the UE by the base station for the purpose of PDCCH monitoring or search may overlap. In this case, the UE may perform PDCCH monitoring or search by at least one or multiple of the following method, or by a combination of multiple methods. Meanwhile, the occasion configured by the base station for the UE for the purpose of PDCCH monitoring or search may be referred to as a first monitoring occasion, and the occasion for PDCCH monitoring or search instructed through the uplink control information from the UE may be referred to as a second monitoring occasion.

Method 1

The UE may receive a PDCCH according to a configured PDCCH monitoring or search configuration. That is, method 1 always follows a PDCCH monitoring or search configuration pre-configured by the base station.

Method 2

PDCCH monitoring or search may be performed by prioritizing a PDCCH monitoring or search configuration corresponding to control channel configuration information instructed by the UE. That is, method 2 always prioritizes the PDCCH monitoring or search configuration according to the UE's instruction.

Method 3

The UE may select a PDCCH to monitor or search for, based on control channel configuration information corresponding to a configured PDCCH monitoring or search configuration. For example, if a configured control channel configuration is configured as a common search space, the configured control channel configuration may be followed, and if the same is configured as a UE-specific search space, control channel configuration information instructed by the UE may be followed. As described above, method 3 follows the PDCCH monitoring or search configuration configured by the base station only if the PDCCH monitoring or search configuration configured by the base station is a common search space, and if the PDCCH monitoring or search configuration configured by the base station is configured as a UE-specific search space, the PDCCH is monitored by using the control channel instructed by the UE.

Method 4

The PDCCH to monitor or search for may be selected based on control channel configuration information instructed by the UE. For example, if control information received through control channel configuration information following the UE's instruction includes ACK/NACK information, the UE may follow control channel configuration information requested by the UE. As described above, method 4 prioritizes the PDCCH monitoring or search configuration instructed by the UE if the PDCCH to be received by the UE includes specific information (for example, ACK/NACK).

In connection with performing Embodiment 2, if the UE instructs multiple slots to share a downlink, PDCCH monitoring or search may be performed in the second downlink slot (Slot #1) 703 by using control channel configuration information instructed by the UE (for example, monitoring or search is performed for each symbol from the fifth symbol (symbol 4) 712). In the following slot 704, the PDCCH monitoring or search configuration that the base station has configured may be used (for example, PDCCH monitoring or search is performed in the first slot 713 only). Alternatively, the UE may perform PDCCH monitoring or search based on control channel configuration information that the UE has instructed with regard to all shared downlink slots.

Embodiment 3

The embodiment proposes a method wherein, in connection with a base station and a UE operating in an unlicensed band, the UE changes a symbol (or slot) configured as an occasion for PDCCH monitoring or search to an uplink transmission resource.

Figure 8:
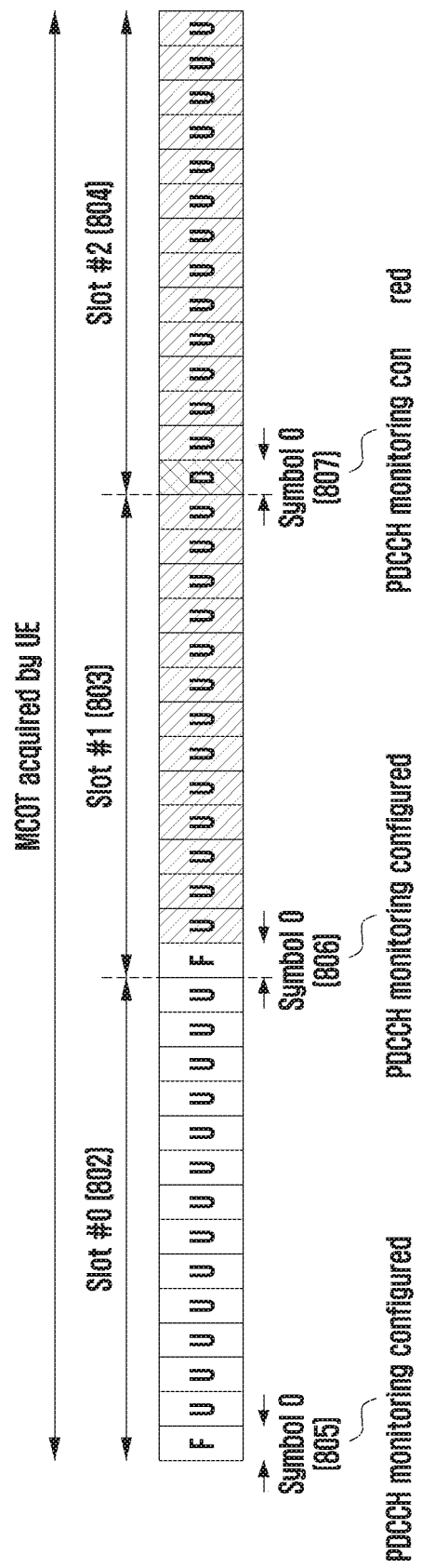
FIG. 8 is a diagram illustrating a method for changing, by a UE, a symbol (or slot) configured as an occasion for PDCCH monitoring or search to an uplink transmission resource according to an embodiment of the disclosure.

FIG. 8 is a diagram illustrating a method for changing, by a UE, a symbol (or slot) configured as an occasion for PDCCH monitoring or search to an uplink transmission resource according to an embodiment of the disclosure.

Operations of the embodiment will now be described with reference to FIG. 8.

It will be assumed, in connection with a base station and a UE transmitting/receiving signals in an unlicensed band, that the UE is configured to perform PUCCH/PUSCH transmission in at least one slot through a grant-free (or configured grant) configuration. The base station may configure some symbols (or first symbols, 805, 806, 807) among slots 802, 803, and 804 transmitted by grant-free (or configured grant) transmission for the purpose of PUCCH monitoring or search, and these symbols may be configured as flexible symbols 805 and 806 or a downlink symbol 807.

Meanwhile, if the UE receives a configuration of grant-free (or configured grant) transmission in a continuous slot from the base station and wants to perform uplink transmission, and if a flexible symbol or a downlink symbol exists in the slot, the flexible symbol 806 or the downlink symbol 807 may be a gap guard between uplink transmissions. Therefore, the channel access procedure may be performed again, due to the gap guard of the flexible symbol or downlink symbol, despite the continuous uplink slot, thereby degrading the uplink performance. Accordingly, the UE needs to change the resource configured as the flexible symbol or downlink symbol to an uplink symbol.

More specifically, the UE may add an SFI to uplink control information transmitted to the base station such that the slot format configured as grant-free (or configured grant) is changed. For example, the SFI may use the SFI structure configured in the NR system described above. According to Table 6, the UE may indicate slot format 1 in uplink control information such that the flexible symbol 806 or downlink symbol 807 inside slots 802, 803 and 804 configured as continuous grant-free (configured grant) transmission resources is changed to an uplink symbol.

According to another method, all flexible symbols or downlink symbols included in continuous grant-free (configured grant) uplink transmission may be changed to uplink symbols by using one-bit signaling. In addition, a new SFI table may be configured for the uplink, thereby indicating the slot format. In addition, the SFI may be configured with regard to a slot or multiple slots at least including uplink control information.

Hereinafter, a method for determining whether or not the UE can change a flexible symbol or a downlink symbol included in a resource for grant-free (configured grant) uplink transmission to an uplink symbol will be described.

Method 1

If the base station has instructed, to a UE, grant-free (configured grant) uplink transmission with regard to at least one, continuous multiple slots by means of upper-level signaling or downlink control information, the UE may determine that the flexible symbol or downlink symbol in the corresponding slot can be changed to an uplink symbol by the above-described method.

Method 2

When configuring a grant-free (configured grant) uplink resource for the UE, the base station may add an instruction regarding whether or not a symbol configuration change is allowed, based on an uplink control signal, to upper-level signaling or downlink control information and may then transmit the same. For example, the base station may instruct continuous uplink resource configuration (or allowing a configuration change using an uplink control signal) by means of upper-level signaling, or may add a continuous uplink resource configuration (or allowing a configuration change using an uplink control signal), based on bit signaling, to downlink control information and may then transmit the same to the UE.

The UE may determine that flexible symbols or downlink symbols included in multiple continuous grant-free (configured grant) uplink slots can be changed to uplink symbols by using uplink control information. That is, according to method 2, upper-level signaling or a downlink control signal may be used to additionally configure whether or not the symbol change is allowed.

Figure 9:
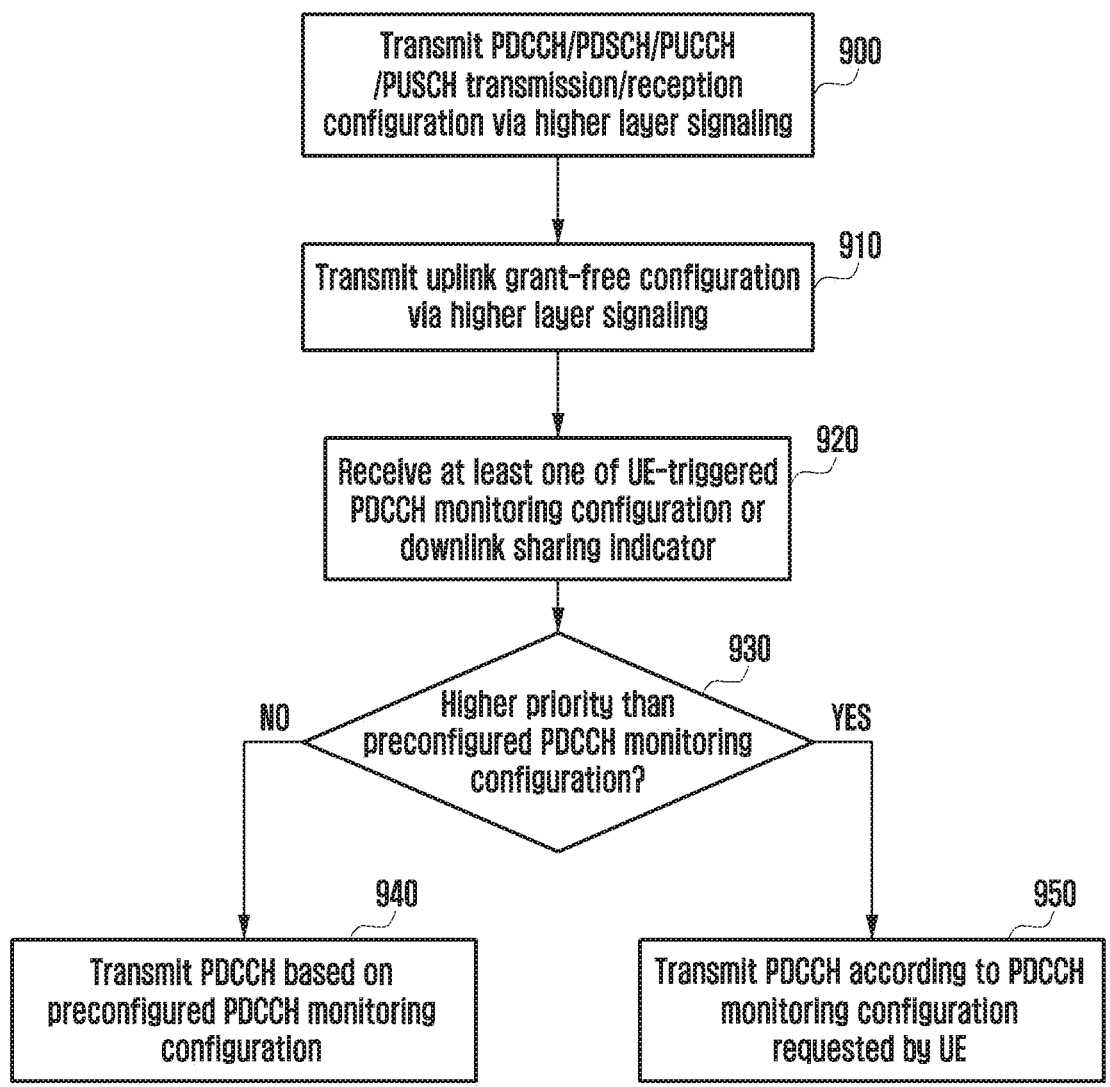
FIG. 9 is a flowchart illustrating operations of a base station according to an embodiment of the disclosure.

FIG. 9 is a flowchart illustrating operations of a base station according to an embodiment of the disclosure.

Operations of a base station according to various embodiments will now be described with reference to FIG. 9.

Referring to FIG. 9, in operation 900, the base station may transmit a configuration regarding PDCCH/PDSCH/PUCCH/PUSCH transmission/reception to a UE through an upper-level signal (for example, radio resource control (RRC)). For example, a configuration regarding a PDCCH resource area, CORESET, search space, or the like for transmitting downlink or uplink scheduling information may be transmitted to the UE through an upper-level signal. In addition, the base station may transmit a configuration regarding PDSCH/PUSCH transmission/reception, including at least one piece of information from among information regarding the offset between the PDCCH transmission slot and the PDSCH transmission slot or PUSCH transmission slot, information regarding the number of repeated PDSCH or PUSCH transmissions, and the like, to the UE through an upper-level signal.

In operation 910, the base station may additionally transmit information regarding a grant-free (configured grant) configuration, such as grant-free (configured grant) transport period and offset information. It is also possible to transmit the grant-free (configured grant)-related configuration information transmitted to the UE in operation 910, in operation 900. The grant-free (configured grant)-related configuration information may include control channel information configured for PDCCH monitoring within the maximum occupancy interval, separately from the above-mentioned CORESET configuration.

In operation 920, the base station may receive, from the UE, at least one of a downlink sharing indicator or information regarding a control channel requested (or instructed) by the UE. The downlink sharing indicator may refer to information indicating that the downlink is used within the maximum occupancy interval. In addition, the information regarding a control channel requested (or instructed) by the UE may refer to information indicating a PDCCH to be monitored by the UE. If the information regarding a control channel requested (or instructed) by the UE is included in uplink control information, the downlink sharing indicator may be omitted.

In operation 930, the base station may confirm whether or not the control channel configuration information preconfigured for the UE has higher priority than the information regarding the control channel instructed from the UE through uplink control information. Meanwhile, operation 930 may be omitted if preconfigured control channel configuration information does not overlap the information regarding the control channel instructed by the UE.

If it is confirmed in operation 930 that the control channel configuration information has a higher priority than the information regarding the control channel instructed from the UE through uplink control information, the base station may transmit a PDCCH based on the preconfigured control channel configuration information in operation 940.

If it is confirmed in operation 930 that the preconfigured control channel configuration information has a lower priority than the information regarding the control channel instructed from the UE through uplink control information, the base station may transmit the PDCCH based on control channel configuration information configured by the UE in operation 950.

Figure 10:
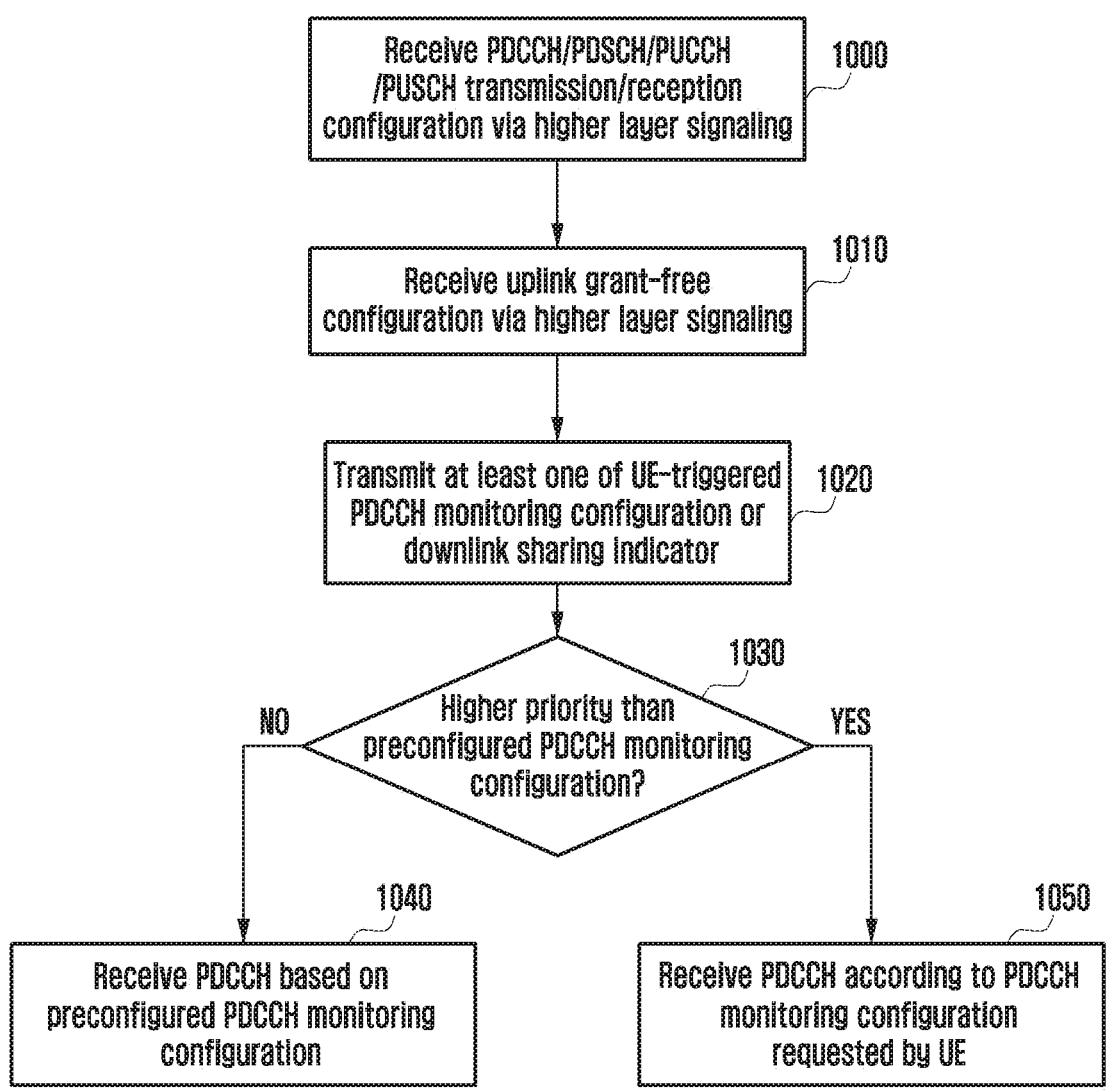
FIG. 10 is a flowchart illustrating operations of a UE according to an embodiment of the disclosure.

FIG. 10 is a flowchart illustrating operations of a UE according to an embodiment of the disclosure.

Operations of a UE according to an embodiment will now be described with reference to FIG. 10.

Referring to FIG. 10, in operation 1000, the UE receives a configuration regarding PDCCH/PDSCH/PUCCH/PUSCH transmission/reception from the base station through an upper-level signal, and makes a configuration regarding PDCCH/PDSCH/PUCCH/PUSCH transmission/reception according to the received configuration information. For example, the UE may receive a configuration regarding a PDCCH resource area or CORESET for receiving downlink or uplink scheduling information, regarding a search space, or the like, from the base station through an upper-level signal.

In operation 1010, the UE may receive additional information regarding a grant-free (configured grant) configuration, such as grant-free (configured grant) transmission period and offset information. The information regarding a grant-free (configured grant) configuration in operation 1010 may be included in the upper-level signal configuration information transmitted in operation 1000. The information regarding a grant-free (configured grant) configuration may include control channel information configured for PDCCH monitoring inside the maximum channel occupancy interval, separately from the above-mentioned CORESET configuration.

In operation 1020, the UE may transmit at least one of a downlink resource sharing indicator or information regarding a control channel indicated by the UE to the base station. The downlink sharing indicator may refer to information indicating that the downlink is used within the maximum occupancy interval. In addition, the information regarding a control channel requested (or indicated) by the UE may refer to information indicating the PDCCH to be monitored by the UE. If the information regarding a control channel requested (or indicated) by the UE is included in the uplink control information, the downlink sharing indicator may be omitted.

In operation 1030, the UE may confirm whether or not the information regarding a control channel indicated through the uplink control information has a higher priority than the preconfigured control channel configuration information. If the preconfigured control channel configuration information does not overlap the information regarding the control channel indicated by the UE, operation 1030 may be omitted.

If it is confirmed in operation 1030 that the preconfigured control channel configuration information has a higher priority than the information regarding the control channel indicated by the UE, the UE may receive a PDCCH based on the preconfigured control channel configuration information in operation 1040.

If it is confirmed in operation 1030 that the preconfigured control channel configuration information has a lower priority than the information regarding the control channel indicated by the UE, the UE may receive the PDCCH based on the control channel configuration information configured by the UE in operation 1050.

Figure 11:
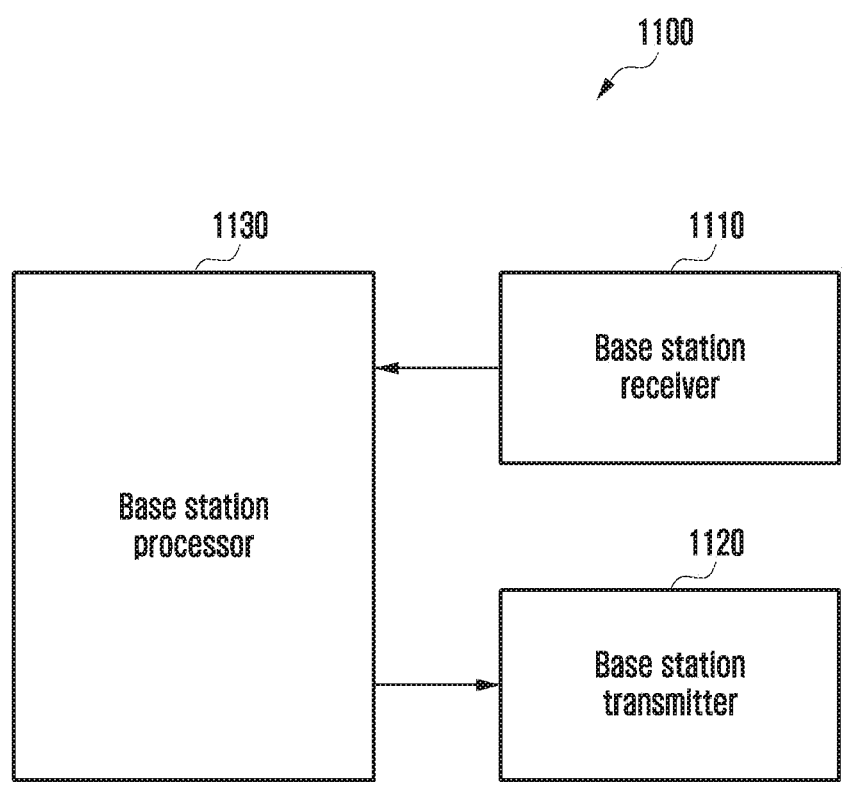
FIG. 11 is a block diagram illustrating the structure of a base station according to an embodiment of the disclosure.

FIG. 11 is a block diagram illustrating the structure of a base station according to an embodiment of the disclosure.

Specifically, FIG. 11 is a block diagram illustrating the inner structure of a base station 1100 according to an embodiment.

Referring to FIG. 11, the base station of the disclosure may include a base station receiver 1110, a base station transmitter 1120, and a base station processor 1130. The base station transmitter 1120 and the base station receiver 1110 may be referred to as a transmitting/receiver as a whole in the embodiment.

The transmitting/receiver may transmit/receive a signal with a UE. The signal may include control information and data. For example, the transmitting/receiver may transmit system information to the UE, and may transmit a synchronization signal or reference signal.

To this end, the transmitting/receiver may include an RF transmitter configured to up-convert and amplify the frequency of a transmitted signal, an RF receiver configured to low-noise-amplify a received signal and to down-convert the frequency thereof, and the like.

In addition, the transmitting/receiver may receive a signal through a wireless channel, input the same to the base station processor 1130, and may transmit a signal outputted from the base station processor 1130 through the wireless channel.

The base station processor 1130 may control a series of operations such that the base station can operate according to the embodiments described above. For example, the base station receiver 1110 may receive a data signal including a control signal transmitted by the UE, and the base station processor 1130 may determine the result of receiving the control signal and the data signal transmitted by the UE. As another example, the base station processor 1130 may perform a channel access procedure with regard to an unlicensed band. As a specific example, the base station receiver 1110 may receive signals transmitted through the unlicensed band, and the base station processor 1130 may compare the intensity of the received signals with a threshold value defined in advance or determined by the value of a function having a bandwidth or the like as a factor, thereby determining whether or not the unlicensed band is idle.

As another example, if the base station receiver 1110 receives information regarding a downlink transport interval and control channel configuration information within a channel occupancy interval of the unlicensed band from the UE, the base station processor 1130 may reconfigure or change the base station's downlink control and data channel transmission time or period, and the base station transmitter 1120 may accordingly transmit the downlink control and data channels. In addition, if the base station receiver 1110 receives information regarding the slot format from the UE, the base station processor 1130 may reconfigure or change the base station's uplink reception time and downlink control and data channel transmission time, and the base station receiver 1110 may accordingly receive the uplink control and data channels.

Figure 12:
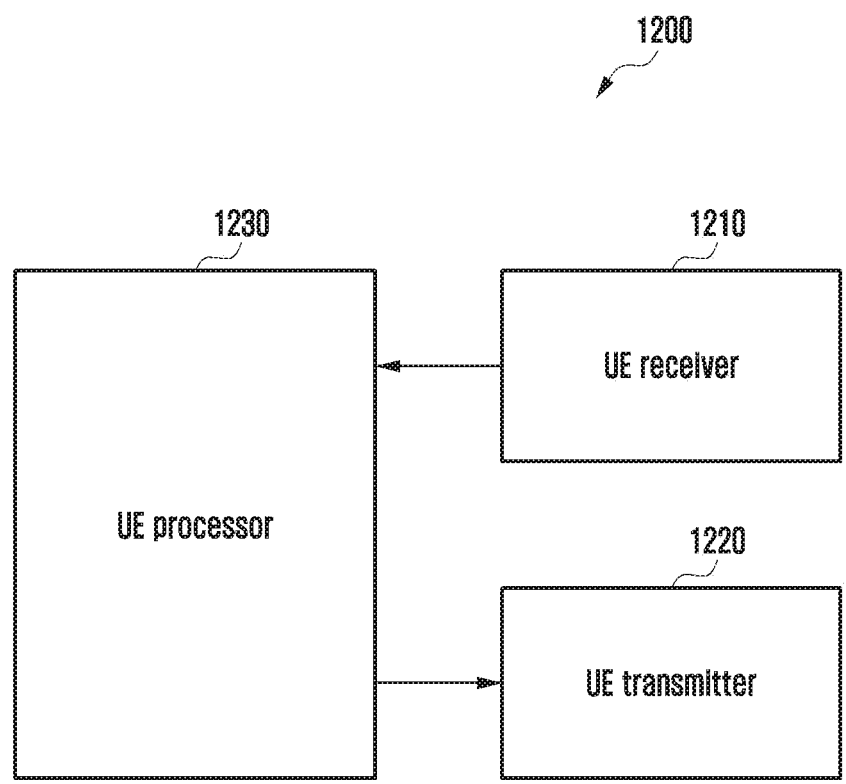
FIG. 12 is a block diagram illustrating the structure of a UE according to an embodiment of the disclosure.

FIG. 12 is a block diagram illustrating the structure of a UE according to an embodiment of the disclosure.

FIG. 12 is a block diagram illustrating the inner structure of a UE according to an embodiment.

Referring to FIG. 12, the UE 1200 of the disclosure may include a UE receiver 1210, a UE transmitter 1220, and a UE processor 1230. The UE receiver 1210 and the UE transmitter 1220 may be referred to as a transmitting/receiver as a whole in the embodiment.

The transmitting/receiver may transmit/receive a signal with the base station. The signal may include control information and data. For example, the transmitting/receiver may receive system information from the base station, and may receive a synchronization signal or a reference signal.

To this end, the transmitting/receiver may include an RF transmitter configured to up-convert and amplify the frequency of a transmitted signal, an RF receiver configured to low-noise-amplify a received signal and to down-convert the frequency thereof, and the like.

In addition, the transmitting/receiver may receive a signal through a wireless channel, may input the same to the UE processor 1230, and may transmit a signal outputted from the UE processor 1230 through the wireless channel.

The UE processor 1230 may control a series of operations such that the UE can operate according to the embodiment described above. For example, the UE receiver 1210 may receive a data signal including a control signal, and the UE processor 1230 may determine the result of receiving the data signal. Thereafter, if it is necessary to transmit a first signal reception result, including the data reception, to the base station at above timing, the UE transmitter 1220 transmits the first signal reception result to the base station at the timing determined by the processor.

As another example, if the UE receiver 1210 receives information regarding an uplink or downlink transport interval inside a channel occupancy interval of the unlicensed band from the base station, the UE processor 1230 may reconfigure or change the UEs' downlink control channel transmission time or period. Alternatively, the UE may reconfigure or change time area assignment information of the scheduled uplink data channel, and the UE receiver 1210 may accordingly receive the downlink control channel transmitted by the base station. As another example, if the UE transmitter 1220 transmits information regarding the downlink transport interval and control channel configuration information to the base station inside the channel occupancy interval of the unlicensed band, the UE receiver 1210 may accordingly receive the downlink control channel and the data signal transmitted by the base station. In addition, the UE may transmit SFI information by the transmitter 1220, and the UE processor 1230 may reconfigure or change time area assignment information of the scheduled uplink data channel according to the transmitted SFI information.

Meanwhile, in the drawings illustrating a method in embodiments, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

Further, if necessary, the above respective embodiments may be employed in combination. For example, parts of embodiments proposed in the disclosure may be combined to operate the bae station and the terminal. In addition, although above embodiments have been presented with reference to 5G/NR systems, other modifications based on the technical idea of the embodiments may also be implemented in connection with other systems such as LTE, LTE-A, and LTE-A-Pro systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   receiving, from a base station, configuration information including a list of control resource sets (CORESETs) and a list of search spaces via radio resource control (RRC) signaling;
   identifying a channel occupancy interval where a signal is transmitted between the terminal and the base station in an unlicensed band;
   in case that at least one symbol within the channel occupancy interval is determined to be used for downlink transmission, transmitting, to the base station, uplink control information (UCI) including information on a CORESET associated with the at least one symbol among the CORESETs and information on a search space associated with the at least one symbol among the search spaces; and
   monitoring a physical downlink control channel (PDCCH) where downlink control information (DCI) for scheduling the downlink transmission is transmitted based on the information on the CORESET and the information on the search space.

2. The method of claim 1, wherein the UCI further includes a slot format indicator for changing a flexible symbol or a downlink symbol included in a continuous slot to an uplink symbol.

3. The method of claim 1, wherein, in case that a first occasion for monitoring the PDCCH being determined based on the configuration information and a second occasion for monitoring the PDCCH being determined based on the UCI are overlapped, an occasion for monitoring the PDCCH is determined as one of the first occasion or the second occasion based on preconfigured priority.

4. The method of claim 1,
   wherein the information on the CORESET includes an index of the CORESET for monitoring the search space, and
   wherein the information on the search space includes a number of PDCCH candidates at aggregation level L, an occasion for symbol-based monitoring within a slot for the search space, a search space type, and a combination of a format of the DCI and a radio network temporary identifier (RNTI) to be monitored in the search space.

5. A method of a base station in a communication system, the method comprising:
   transmitting, to a terminal, configuration information including a list of control resource sets (CORESETs) and a list of search spaces via radio resource control (RRC) signaling;
   receiving, from the terminal, uplink control information (UCI), including information on a CORESET associated with at least one symbol among the CORESETs and information on a search space associated with the at least one symbol among the search spaces; and
   transmitting, to the terminal, downlink control information (DCI) for scheduling downlink transmission on a physical downlink control channel (PDCCH) based on the information on the CORESET and the information on the search space,
   wherein the UCI is received from the terminal in case that the at least one symbol within a channel occupancy interval where a signal is transmitted between the terminal and the base station in an unlicensed band is determined to be used for the downlink transmission.

6. The method of claim 5, wherein the UCI further includes a slot format indicator for changing a flexible symbol or a downlink symbol included in a continuous slot to an uplink symbol.

7. The method of claim 5, wherein, in case that a first occasion for transmitting the DCI being determined based on the configuration information and a second occasion for transmitting the DCI being determined based on the UCI are overlapped, an occasion for transmitting the DCI is determined as one of the first occasion or the second occasion based on preconfigured priority.

8. The method of claim 5,
   wherein the information on the CORESET includes an index of the CORESET for monitoring the search space, and
   wherein the information on the search space includes a number of PDCCH candidates at aggregation level L, an occasion for symbol-based monitoring within a slot for the search space, a search space type, and a combination of a format of the DCI and a radio network temporary identifier (RNTI) to be monitored in the search space.

9. A terminal in a communication system, the terminal comprising:
- a transceiver; and
- a controller coupled with the transceiver and configured to:
  - receive, from a base station, configuration information including a list of control resource sets (CORESETs) and a list of search spaces via radio resource control (RRC) signaling,
  - identify a channel occupancy interval where a signal is transmitted between the terminal and the base station in an unlicensed band,
  - in case that at least one symbol within the channel occupancy interval is determined to be used for downlink transmission, transmit, to the base station, uplink control information (UCI) including information on a CORESET associated with the at least one symbol among the CORESETs and information on a search space associated with the at least one symbol among the search spaces, and
  - monitor a physical downlink control channel (PDCCH) where downlink control information (DCI) for scheduling the downlink transmission is transmitted based on the information on the CORESET and the information on the search space.

10. The terminal of claim 9, wherein the UCI further includes a slot format indicator for changing a flexible symbol or a downlink symbol included in a continuous slot to an uplink symbol.

11. The terminal of claim 9, wherein, in case that a first occasion for monitoring the PDCCH being determined based on the configuration information and a second occasion for monitoring the PDCCH being determined based on the UCI are overlapped, an occasion for monitoring the PDCCH is determined as one of the first occasion or the second occasion based on preconfigured priority.

12. The terminal of claim 9,
- wherein the information on the CORESET includes an index of the CORESET for monitoring the search space, and
- wherein the information on the search space includes a number of PDCCH candidates at aggregation level L, an occasion for symbol-based monitoring within a slot for the search space, a search space type, and a combination of a format of the DCI and a radio network temporary identifier (RNTI) to be monitored in the search space.

13. A base station in a communication system, the base station comprising:
- a transceiver; and
- a controller coupled with the transceiver and configured to:
  - transmit, to a terminal, configuration information including a list of control resource sets (CORESETs) and a list of search spaces via radio resource control (RRC) signaling,
  - receive, from the terminal, uplink control information (UCI) including information on a CORESET associated with at least one symbol among the CORESETs and information on a search space associated with the at least one symbol among the search spaces, and
  - transmit, to the terminal, downlink control information (DCI) for scheduling downlink transmission on a physical downlink control channel (PDCCH) based on the information on the CORESET and the information on the search space,
  - wherein the UCI is received from the terminal in case that the at least one symbol within a channel occupancy interval where a signal is transmitted between the terminal and the base station in an unlicensed band is determined to be used for the downlink transmission.

14. The base station of claim 13, wherein the UCI further includes a slot format indicator for changing a flexible symbol or a downlink symbol included in a continuous slot to an uplink symbol.

15. The base station of claim 13, wherein, in case that a first occasion for transmitting the DCI being determined based on the configuration information and a second occasion for transmitting the DCI being determined based on the UCI are overlapped, an occasion for transmitting the DCI is determined as one of the first occasion or the second occasion based on preconfigured priority.

16. The base station of claim 13,
- wherein the information on the CORESET includes an index of the CORESET for monitoring the search space, and
- wherein the information on the search space includes a number of PDCCH candidates at aggregation level L, an occasion for symbol-based monitoring within a slot for the search space, a search space type, and a combination of a format of the DCI and a radio network temporary identifier (RNTI) to be monitored in the search space.

\* \* \* \* \*